United States Patent
Hirai et al.

(10) Patent No.: US 9,205,422 B2
(45) Date of Patent: Dec. 8, 2015

(54) ION-EXCHANGE FIBERS AND METHOD FOR PRODUCING AND USING SAME

(75) Inventors: Yusuke Hirai, Hyogo (JP); Wataru Mio, Hyogo (JP); Masanobu Tamura, Hyogo (JP); Yoshitomo Matsumoto, Hyogo (JP); Takao Michinobu, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 152 days.

(21) Appl. No.: 14/113,704

(22) PCT Filed: Apr. 27, 2012

(86) PCT No.: PCT/JP2012/061415
§ 371 (c)(1),
(2), (4) Date: Oct. 24, 2013

(87) PCT Pub. No.: WO2012/147937
PCT Pub. Date: Nov. 1, 2012

(65) Prior Publication Data
US 2014/0048489 A1    Feb. 20, 2014

(30) Foreign Application Priority Data

Apr. 27, 2011 (JP) ................... 2011-100244
Apr. 2, 2012 (JP) ................... 2012-084389
Apr. 2, 2012 (JP) ................... 2012-084394

(51) Int. Cl.
*B01J 47/12* (2006.01)
*G21F 9/12* (2006.01)
(Continued)

(52) U.S. Cl.
CPC ............. *B01J 47/123* (2013.01); *B01J 41/14* (2013.01); *B01J 45/00* (2013.01); *B01J 47/12* (2013.01);
(Continued)

(58) Field of Classification Search
None
See application file for complete search history.

(56) References Cited

U.S. PATENT DOCUMENTS 3,055,729 A    9/1962    Richter, Jr. et al.
6,869,537 B1    3/2005    Nambu et al.
(Continued)

FOREIGN PATENT DOCUMENTS

JP    S52-023861    2/1977
JP    S55-050032    4/1980
(Continued)

OTHER PUBLICATIONS

Bytsan et al.: "Fibrous Anion-Exchangers Based on Graft Copolymers of Polyacrylonitrile With Glycidyl Methacrylate"; Russian Journal of Applied Chemistry, Pleiades Publishing, Springer, NY, vol. 61, No. 12, part 2, Dec. 1, 1988, pp. 2473-2478.
(Continued)

*Primary Examiner* — Chester Barry
(74) *Attorney, Agent, or Firm* — Hamre, Schumann, Mueller & Larson, P.C.

(57) ABSTRACT

Provided is an ion-exchange fiber including a polymer A obtained by introducing an ion-exchangeable substituent to 100 parts by weight of an acrylic polymer that is obtained by polymerization of a monomer composition containing 30 % by weight or more of acrylonitrile with respect to 100 % by weight of the composition and a polymer B obtained by introducing an ion-exchangeable substituent to 1 part by weight or more and 100 parts by weight or less of an epoxy group-containing polymer. Each ion-exchangeable substituent is introduced by reaction with an amine compound and is an ion-exchangeable substituent derived from the amine compound. A method for producing the ion-exchange fiber is also provided.

23 Claims, 5 Drawing Sheets

Relation between adsorption time and adsorption ratio

□ (Example 21) Ion-exchange fiber 7
△ (Example 22) Ion-exchange fiber 8
* (Example 23) Ion-exchange fiber 9

Adsorption time (min)

(51) Int. Cl.
*C02F 1/42* (2006.01)
*C08J 5/20* (2006.01)
*D06M 13/332* (2006.01)
*D01F 6/54* (2006.01)
*B01J 41/14* (2006.01)
*D01F 11/06* (2006.01)
*B01J 45/00* (2006.01)
*D06M 101/28* (2006.01)

(52) U.S. Cl.
CPC ... *C02F 1/42* (2013.01); *C08J 5/20* (2013.01); *D01F 6/54* (2013.01); *D01F 11/06* (2013.01); *D06M 13/332* (2013.01); *G21F 9/12* (2013.01); *G21F 9/125* (2013.01); *D06M 2101/28* (2013.01)

(56) References Cited

U.S. PATENT DOCUMENTS

| | | | |
|---|---|---|---|
| 6,875,508 | B1 | 4/2005 | Nambu et al. |
| 2007/0243377 | A1 | 10/2007 | Nishida et al. |

FOREIGN PATENT DOCUMENTS

| | | |
|---|---|---|
| JP | S62-238337 | 10/1987 |
| JP | H01-234428 | 9/1989 |
| JP | H06-227813 | 8/1994 |
| JP | H09-150066 | 6/1997 |
| JP | 2000-328449 | 11/2000 |
| JP | 2001-011320 | 1/2001 |
| JP | 2002-018283 | 1/2002 |
| JP | 2005-349241 | 12/2005 |
| JP | 2009-007728 | 1/2009 |
| JP | 2009-063354 | 3/2009 |
| JP | 2010-077361 | 4/2010 |
| JP | 2011-167606 | 9/2011 |

OTHER PUBLICATIONS

A A Lysenko et al.: "Carbochain Ion-Exchange Fibres Prepared by the Graft Polymerization Method"; Fibre Chemistry, vol. 19, No. 1, Jan. 1, 1987, pp. 20-24.

Extended European Search Report, Dec. 10, 2014; European Patent Application No. 12776597.2 (4 pages).

ION-EXCHANGE FIBERS AND METHOD FOR PRODUCING AND USING SAME

TECHNICAL FIELD

The present invention relates to an ion-exchange fiber, a method for producing the ion-exchange fiber, a method for removing and adsorbing a chemical substance in water, and a device for removing and adsorbing a chemical substance in water. In particular, the present invention relates to an ion-exchange fiber having practically sufficient fiber strength and ion-exchange capacity and use of the fiber.

BACKGROUND ART

The global increase in population and industrialization has required efficient treatment methods and recycling methods of waste water containing various chemical substances. On this account, various water treatment methods have been developed and used. Examples of such a method include a solid phase adsorption method using activated carbon or an ion-exchange material, a separation method using a hollow fiber membrane, an electrochemical method employing electrodialysis or other techniques, a coagulation-sedimentation method, a coprecipitation method, and an activated sludge method. These methods are properly used depending on the quality or amount of waste water to be treated. Among them, the solid phase adsorption method is excellent in environmental load and operability.

The solid phase adsorption method employs adsorbents having a wide variety of shapes. Among them, an ion-exchange fiber, which has a larger specific surface area than that of ion-exchange resin beads, typically achieves excellent adsorption speed. The ion-exchange fiber can also be processed into an arbitrary form, for example, non-woven fabric, woven fabric, thread, and chenille yarn. Focusing on such characteristics has led to the development of various fibrous adsorbents.

Patent Document 1, for example, discloses a method for removing and adsorbing copper ions in waste water by treating waste water exhausted from a copper pyrophosphate plating process with a weak basic anion-exchange fiber having a polyethylenepolyamino group. However, the method intends to remove copper ions alone, and thus there is a demand for techniques capable of removing and adsorbing other various chemical substances present in water.

An additional ion-exchange fiber is, for example, a fiber containing an amino group. The fiber is obtained by treating an acrylic fiber with an amine compound to introduce a cross-linked structure and an amino group at the same time (see Patent Document 2). Patent Document 2 describes that the acrylic fiber may be, in addition to a typical acrylic fiber, a modacrylic fiber that is obtained by copolymerization with, for example, vinyl chloride and has high chemical resistance, but describes no modacrylic fiber in Examples. Using the modacrylic fiber in a practical reaction causes dehydrohalogenation as a side reaction to reduce the fiber strength, and thus the method fails to produce an ion-exchange fiber capable of withstanding practical processing and use.

Another ion-exchange fiber is an ion-exchange fiber obtained by introducing a cation-exchange group or an anion-exchange group to a fiber that is prepared by polymer-blending a modacrylic polymer and an epoxy group-containing polymer (see Patent Document 3). The method disclosed in Patent Document 3 uses a modacrylic fiber and can produce an ion-exchange fiber. However, the method introduces a substituent to an epoxy group alone, and accordingly has a limitation to the amount of ion-exchangeable substituent capable of being introduced. Thus, there is a demand for improvement in the ion-exchange capacity.

In addition to the ion-exchange fibers, various ion-exchange fibers are disclosed, including an anion-exchange resin produced by reacting an aromatic cross-linked copolymer having a haloalkyl group with an amine in the presence of predetermined amounts of water and an inorganic salt (see Patent Document 4), an ion-exchange fiber produced by introducing primary to quaternary amines to polyvinyl alcohol (see Patent Document 5), a polymer containing a predetermined amount of a potassium carboxylate group and having a cross-linked structure (see Patent Document 6), a polymer cross-linked through a particular structure between chitosan molecules (see Patent Document 7), and a cation exchange fiber produced by introducing a predetermined amount of a carboxyl group to an acrylic fiber (Patent Document 8). Each of the resins and the fibers still has room for improvement in the adsorption and removal performance of chemical substances.

In a nuclear power plant, especially in the cooling system or the exhaust system of a nuclear reactor, a nuclear fuel rod having a breakage such as a pinhole exhausts fission products such as $^{129}I$ and $^{131}I$. Among them, $^{129}I$ has a long half-life of $10^7$ years but is exhausted in a small amount and has a low energy. On the other hand, $^{131}I$ has a short half-life of 8 days but is exhausted in a large amount and has a high energy. Accordingly, the most harmful fission product from the waste water and exhaust systems of a nuclear reactor is $^{131}I$, which is a subject to be measured and evaluated in a nuclear facility.

It takes a long period of time to carry spent nuclear fuel from a nuclear facility to a spent nuclear fuel reprocessing plant, at which the amount of $^{131}I$ having a short half-life is small but the amount of $^{129}I$ having a long half-life is large. Typical chemical forms of radioactive iodine exhausted from a nuclear facility are considered to be three forms of iodine ($I_2$), hydroiodic acid (HI), and methyl iodide ($CH_3I$). Among them, the nonionic methyl iodide is most difficult to be removed.

Existing methods of removing radioactive iodine exhausted from nuclear facilities are as follows:

(1) A large amount of alkali-impregnated activated carbon impregnated with potassium iodide (KI) is used for isotope exchange of $^{131}I$ as the radioactive iodine for nonradioactive iodine to thus collect the radioactive iodine.

(2) A gas or liquid containing iodine is brought into contact with impregnated activated carbon impregnated with triethylenediamine (TEDA) or with a strong base anion exchanger to react a tertiary amino group with methyl iodide to thus remove iodine.

(3) A gas or liquid containing iodine is brought into contact with silver zeolite to collect the iodine as silver iodide.

Among them, to remove methyl iodide, the removal techniques (2) and (3) are applied. Hydroiodic acid, which is acidic, can be removed with alkali-impregnated activated carbon or a strong base anion exchanger. In addition, the method of removing molecular iodine ($I_2$) is exemplified by a method of absorption to KI and a method of employing a polymer material produced by graft polymerization of polyvinylpyrrolidone.

However, the above methods employing impregnated activated carbon impregnated with potassium iodide or TEDA require the activated carbon in a large amount, and this increases the cost and concurrently causes a disposal problem of the activated carbon used. The method employing silver zeolite requires expensive silver zeolite. It also requires dehydration, heating at 150° C., and other steps to complicate the process, and fails to achieve a satisfactory removal ratio of radioactive iodine.

There is a much larger problem. The method for removing ionic substances such as iodine ($I_2$) and hydroiodic acid is quite different from that for removing nonionic substances such as methyl iodide. In order to completely remove radioactive iodine from a system containing such ionic substances and nonionic substances, both methods are required to be combined and this complicates the removal method.

As described above, there is a demand for an ion-exchange fiber capable of efficiently removing and adsorbing not only various chemical substances in waste water but also chemical substances such as radioactive iodine compounds and for a method for removing and adsorbing chemical substances in water.

CITATION LIST

Patent Literatures

Patent Document 1: JP-A No. S52-23861
Patent Document 2: JP-A No. 2009-7728
Patent Document 3: JP-A No. S55-50032
Patent Document 4: JP-A No. H09-150066
Patent Document 5: JP-A No. S62-238337
Patent Document 6: JP-A No. 2001-11320
Patent Document 7: JP-A No. H06-227813
Patent Document 8: JP-A No. H01-234428

Summary of Invention

Technical Problem

In view of the above circumstances, the present invention has an object to provide an ion-exchange fiber that has practically sufficient fiber strength and ion-exchange capacity and is useful for removing and adsorbing various chemical substances present in a liquid such as water, a method for producing the ion-exchange fiber, and a method and a device for removing and adsorbing chemical substances in water.

Solution to Problem

As a result of repeated intensive studies in order to solve the problems, the inventors of the present invention have found that a monomer composition containing a predetermined amount of acrylonitrile is polymerized to give an acrylic polymer, the acrylic polymer is blended with an epoxy group-containing polymer to give a fiber, the fiber is reacted with an amine compound to yield an ion-exchange fiber capable of solving the problems, and have accomplished the invention.

That is, an aspect of the present invention is an ion-exchange fiber including a polymer A obtained by introducing an ion-exchangeable substituent to 100 parts by weight of an acrylic polymer, the acrylic polymer being obtained by polymerization of a monomer composition containing 30% by weight or more of acrylonitrile with respect to 100% by weight of the composition, and a polymer B obtained by introducing an ion-exchangeable substituent to 1 part by weight or more and 100 parts by weight or less of an epoxy group-containing polymer. Each ion-exchangeable substituent is introduced by reaction with an amine compound and is an ion-exchangeable substituent derived from the amine compound.

Another aspect of the present invention is the ion-exchange fiber, in which the acrylic polymer is a modacrylic polymer obtained by polymerization of a monomer composition containing 30% by weight or more and 70% by weight or less of acrylonitrile, 30% by weight or more and 70% by weight or less of a halogen-containing vinylidene monomer and/or halogen-containing vinyl monomer, and 0% by weight or more and 10% by weight or less of a vinyl monomer copolymerizable with them, with respect to 100% by weight of the composition.

Another aspect of the present invention is the ion-exchange fiber, in which the amine compound includes a compound having two or more amino groups in total per molecule.

Another aspect of the present invention is the ion-exchange fiber, in which the amine compound includes a compound having an amino group in total per molecule.

Another aspect of the present invention is the ion-exchange fiber including the polymer A obtained by introducing the ion-exchangeable substituent to 100 parts by weight of the modacrylic polymer and the polymer B obtained by introducing the ion-exchangeable substituent to 1 part by weight or more and 70 parts by weight or less of the epoxy group-containing polymer.

Another aspect of the present invention is the ion-exchange fiber including the polymer A obtained by introducing the ion-exchangeable substituent to 100 parts by weight of the modacrylic polymer and the polymer B obtained by introducing the ion-exchangeable substituent to 1 part by weight or more and less than 50 parts by weight of the epoxy group-containing polymer.

Another aspect of the present invention is the ion-exchange fiber including the polymer A obtained by introducing the ion-exchangeable substituent to 100 parts by weight of the modacrylic polymer and the polymer B obtained by introducing the ion-exchangeable substituent to 1 part by weight or more and 30 parts by weight or less of the epoxy group-containing polymer.

Another aspect of the present invention is the ion-exchange fiber, in which the amine compound includes a compound having at least one primary amine as an amino group.

Another aspect of the present invention is the ion-exchange fiber, in which the amine compound includes a compound having at least one polar substituent in addition to an amino group.

Another aspect of the present invention is the ion-exchange fiber having a fiber strength of 0.8 cN/dtex or more and an ion-exchange capacity of 0.8 mmol/g or more.

Another aspect of the present invention is the ion-exchange fiber, in which the amine compound is reacted to increase the nitrogen content by 1.0% by weight or more.

Another aspect of the present invention is the ion-exchange fiber, in which the acrylic polymer contains a halogen atom and is reacted with the amine compound to reduce the halogen content by 1.0% by weight or more.

Another aspect of the present invention is the ion-exchange fiber, in which the ion-exchange capacity is 1.0 mmol/g or more.

Another aspect of the present invention is an ion-exchange fiber, the ion-exchange fiber is a cross-linked acrylic fiber introduced with an ion-exchangeable substituent derived from an amine compound by reaction with the amine compound, and the cross-linked acrylic fiber is cross-linked by the amine compound. The amine compound is reacted to increase the nitrogen content by 1.0% by weight or more, and the ion-exchange fiber has a fiber strength of 0.8 cN/dtex or more and an ion-exchange capacity of 0.8 mmol/g or more.

Another aspect of the present invention is the ion-exchange fiber, in which the cross-linked acrylic fiber is a cross-linked modacrylic fiber.

Another aspect of the present invention is the ion-exchange fiber, in which the cross-linked acrylic fiber contains a halogen atom and is reacted with the amine compound to reduce the halogen content by 1.0% by weight or more.

Another aspect of the present invention is the ion-exchange fiber, in which the ion-exchange capacity is 1.0 mmol/g or more.

Another aspect of the present invention is a method for producing the ion-exchange fiber. The method includes the steps of (1) blending and spinning 100 parts by weight of an acrylic polymer obtained by polymerization of a monomer composition containing 30% by weight or more of acrylonitrile with respect to 100% by weight of the composition and 1 part by weight or more and 100 parts by weight or less of an epoxy group-containing polymer to yield a precursor fiber and (2) reacting the precursor fiber with an amine compound at a temperature of higher than 100° C. to introduce an ion-exchangeable substituent derived from the amine compound to the acrylic polymer and the epoxy group-containing polymer included in the precursor fiber.

Another aspect of the present invention is a method for removing and adsorbing a chemical substance in water, the method employs an ion-exchange fiber, and the ion-exchange fiber is the ion-exchange fiber above.

Another aspect of the present invention is the method for removing and adsorbing a chemical substance, in which the chemical substance is an ionic chemical substance.

Another aspect of the present invention is the method for removing and adsorbing a chemical substance in water, in which the ionic chemical substance is an ionic chemical substance containing at least one ion selected from the group consisting of anions selected from a halide ion, a polyhalide ion, and an oxoacid ion; and ions of the group III to XVI heavy metals, ions of heavy metallic elements selected from lanthanoids and actinoids, and complex ions of them.

Another aspect of the present invention is the method for removing and adsorbing a chemical substance in water, in which the ionic chemical substance is an ionic chemical substance containing a halide ion and the halide ion is an iodide ion.

Another aspect of the present invention is a device for removing and adsorbing a chemical substance in water, and the device includes an adsorbent including at least one ion-exchange fiber selected from the ion-exchange fibers above.

Advantageous Effects of Invention

An ion-exchange fiber of the present invention has practically sufficient fiber strength and ion-exchange capacity and has a beneficial effect on the removal and adsorption of various chemical substances present in water. A method for producing the ion-exchange fiber of the present invention can provide such an ion-exchange fiber. A method and a device of the present invention can efficiently remove and adsorb various chemical substances in water.

DESCRIPTION OF EMBODIMENTS

Figure 1:
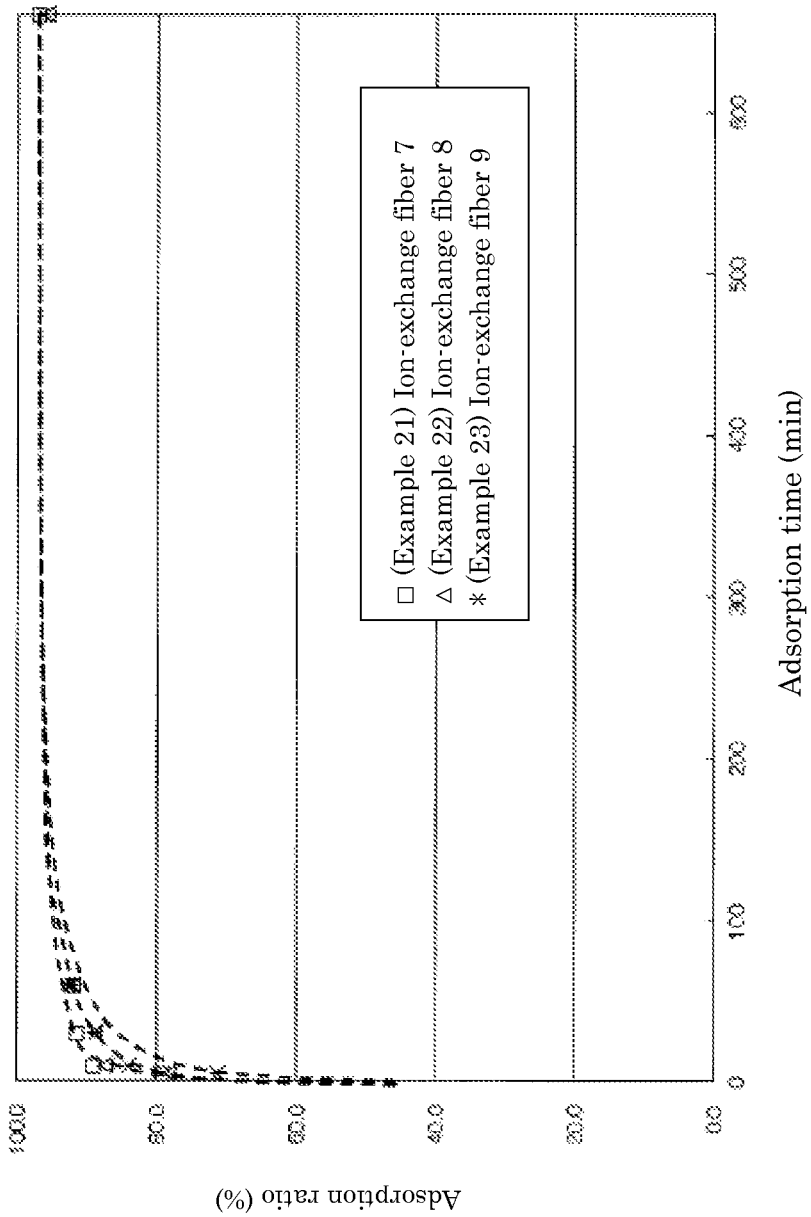
FIG. 1 is a graph showing results of Examples 21 to 23.

An ion-exchange fiber, a method for producing the ion-exchange fiber, and a method and a device for removing and adsorbing a chemical substance in water of the present invention will be described in further detail.

[Ion-Exchange Fiber]

In the present invention, an ion-exchange fiber means a fiber having an ion-exchangeable substituent in its structure and having ion-exchange capacity. Examples of the ion-exchangeable substituent include a cation-exchangeable substituent, an anion-exchangeable substituent, and a chelating substituent having two or more polar groups. In other words, the ion-exchange fiber in the present invention refers to a chelating fiber in addition to typical ion-exchange fibers.

The ion-exchange fiber in the present invention includes a polymer A and a polymer B. The polymer A is a polymer obtained by introducing an ion-exchangeable substituent derived from an amine compound to 100 parts by weight of an acrylic polymer by reaction with the amine compound, and the acrylic polymer is obtained by polymerization of a monomer composition containing 30% by weight or more of acrylonitrile with respect to 100% by weight of the composition. The polymer B is a polymer obtained by introducing an ion-exchangeable substituent derived from an amine compound to 1 part by weight or more and 100 parts by weight or less of an epoxy group-containing polymer by reaction with the amine compound.

The acrylonitrile contained in the acrylic polymer in the polymer A has a cyano group, has appropriate reactivity with respect to the amine compound and high chemical resistance, and thus is suitable for producing the ion-exchange fiber of the present invention. Using an acrylic polymer obtained by polymerization of a monomer composition containing 30% by weight or more of acrylonitrile with respect to the total amount enables the production of an ion-exchange fiber to which an amine compound is sufficiently introduced. The polymer A may further has a cross-linked structure as its partial structure.

For the acrylic polymer in the polymer A, the monomer composition may contain additional monomers copolymerizable with acrylonitrile. Examples of such a monomer include, but are not necessarily limited to, various vinyl monomers including halogen-containing vinylidene monomers such as vinylidene chloride, vinylidene bromide, and vinylidene iodide, halogen-containing vinyl monomers such as vinyl chloride, vinyl bromide, and vinyl iodide, acrylic acid and esters thereof, methacrylic acid and esters thereof, acrylamide, methacrylamide, vinyl acetate, vinylsulfonic acid and salts thereof, methallylsulfonic acid and salts thereof, styrenesulfonic acid and salts thereof, and 2-acrylamide-2-methylsulfonic acid and salts thereof. The additional monomers copolymerizable with acrylonitrile may be used singly or in combination of two or more of them.

The acrylic polymer in the polymer A is preferably a modacrylic polymer obtained by polymerization of a monomer composition containing 30% by weight or more and 70% by weight or less of acrylonitrile, 30% by weight or more and 70% by weight or less of a halogen-containing vinylidene monomer and/or a halogen-containing vinyl monomer, and 0% by weight or more and 10% by weight or less of a vinyl monomer copolymerizable with them, with respect to 100% by weight of the composition. The modacrylic polymer has higher chemical resistance than that of other acrylic polymers and thus is suitably used in an ion-exchange fiber.

In the present invention, producing an ion-exchange fiber even with the modacrylic polymer as the polymer A does not reduce the fiber strength, which is commonly reduced by the reaction of the modacrylic polymer with an amine compound, and a sufficient amount of an ion-exchangeable substituent is introduced to the modacrylic polymer. On this account, the ion-exchange fiber of the present invention including the modacrylic polymer as the polymer A has a fiber strength of 0.8 cN/dtex or more and an ion-exchange capacity of 0.8 mmol/g or more, which are practically sufficient fiber strength and ion-exchange capacity.

The epoxy group-containing polymer in the polymer B has high reactivity to an amine compound, and thus blending the epoxy group-containing polymer in the acrylic polymer improves the total reactivity to an amine compound to yield an ion-exchange fiber having much higher ion-exchange capacity. The polymer B may have a cross-linked structure as its partial structure.

The method for producing the ion-exchange fiber of the present invention is exemplified by a method including a process (1) of blending and spinning an acrylic polymer and an epoxy group-containing polymer by a method such as polymer blending to yield a precursor fiber as a base material (hereinafter called "production process of a precursor fiber") and a process (2) of reacting the obtained precursor fiber with an amine compound to introduce an ion-exchangeable substituent derived from the amine compound to the acrylic polymer and the epoxy group-containing polymer included in the precursor fiber (hereinafter called "introduction process of an ion-exchangeable substituent"). In particular, for an ion-exchange fiber including a modacrylic polymer as the acrylic polymer, reacting an amine compound with a precursor fiber obtained by blending and spinning the modacrylic polymer and an epoxy group-containing polymer can solve the conventional problem with the fiber strength of an ion-exchange fiber that is obtained by reacting the modacrylic polymer with an amine compound.

In the method, the production process of a precursor fiber as the first step can employ a known spinning method such as melt spinning, wet spinning, and dry spinning depending on a purpose. Among them, the wet spinning is preferred because it can yield a fiber at a comparatively lower temperature than that by other methods and thus is unlikely to cause ring-opening reaction of an epoxy group during the spinning process.

The acrylic polymer used in the first step may be any acrylic polymer obtained by polymerization of a monomer composition containing 30% by weight or more of acrylonitrile with respect to 100% by weight of the composition and is preferably a modacrylic polymer.

The modacrylic polymer in the present invention is a polymer obtained by polymerization of a monomer composition containing acrylonitrile and a halogen-containing vinylidene monomer and/or a halogen-containing vinyl monomer. The modacrylic polymer in the present invention may be a polymer obtained by polymerization of a monomer composition containing, in addition to the acrylonitrile and the halogen-containing vinylidene monomer and/or the halogen-containing vinyl monomer, a vinyl monomer copolymerizable with them.

The modacrylic polymer in the present invention is obtained by polymerization of a monomer composition containing 30% by weight or more and 70% by weight or less, preferably 35% by weight or more and 60% by weight or less, and more preferably 40% by weight or more and 55% by weight or less of acrylonitrile, with respect to 100% by weight of the monomer composition.

Examples of the halogen-containing vinylidene monomer and the halogen-containing vinyl monomer include vinyl compounds containing halogen in the molecule. More specifically, non-limiting examples of the halogen-containing vinylidene monomer include vinylidene chloride, vinylidene bromide, and vinylidene iodide, and non-limiting examples of the halogen-containing vinyl monomer include vinyl chloride, vinyl bromide, and vinyl iodide. The present invention employs one or more monomers selected from such a monomer group.

The modacrylic polymer in the present invention is obtained by polymerization of a monomer composition containing, in addition to acrylonitrile, 30% by weight or more and 70% by weight or less, preferably 40% by weight or more and 65% by weight or less, and more preferably 45% by weight or more and 55% by weight or less of a halogen-containing vinylidene monomer and/or a halogen-containing vinyl monomer, with respect to 100% by weight of the monomer composition.

Non-limiting examples of the vinyl monomer copolymerizable with at least one of acrylonitrile, a halogen-containing vinylidene monomer, and a halogen-containing vinyl monomer include various vinyl monomers such as acrylic acid and esters thereof, methacrylic acid and esters thereof, acrylamide, methacrylamide, vinyl acetate, vinylsulfonic acid and salts thereof, methallylsulfonic acid and salts thereof, styrenesulfonic acid and salts thereof, and 2-acrylamide-2-methylsulfonic acid and salts thereof. These vinyl monomers may be used singly or in combination of two or more of them. Such a monomer is preferably added to a monomer composition in such a range as not to impair the fiber strength and is copolymerized. Specifically, the monomer is preferably added in an amount of 0% by weight or more and 10% by weight or less with respect to 100% by weight of the monomer composition.

The modacrylic polymer in such a range typically has higher chemical resistance than that of an acrylic polymer containing acrylonitrile in an amount of 85% by weight or more and thus is suitable as the base polymer for an ion-exchange fiber. In particular, a modacrylic polymer in the preferred range or in the more preferred range has much higher chemical resistance.

The epoxy group-containing polymer used in combination with the acrylic polymer in the production process of a precursor fiber as the first step means a homopolymer or a copolymer of a monomer containing an epoxy group in the molecule. The epoxy group-containing monomer may be any monomer satisfying the condition, and examples include glycidyl acrylate, glycidyl methacrylate, allyl glycidyl ether, methallyl glycidyl ether, 4-hydroxybutyl acrylate glycidyl ether, glycidyl vinylsulfonate, and glycidyl methitaconate. Among them, glycidyl methacrylate is preferably used. This is because a homopolymer or copolymer of glycidyl methacrylate has high compatibility with a modacrylic polymer and thus readily affords a fiber having high fiber strength. The number of epoxy groups per molecule of the epoxy group-containing monomer is not particularly limited but is preferably 50 to 1,500 and more preferably 100 to 1,000. The amount of the epoxy group-containing polymer is desirably controlled depending on the type of an amine compound used and an intended fiber strength and ion-exchange capacity.

The epoxy group-containing polymer as a copolymer contains an epoxy group-containing monomer and a monomer copolymerizable with the epoxy group-containing monomer. The monomer copolymerizable with the epoxy group-containing monomer may be any monomer copolymerizable with the epoxy group-containing monomer and is not particularly limited.

The ion-exchange fiber of the present invention includes the epoxy group-containing polymer in an amount of 1 part by weight or more and 100 parts by weight or less, preferably 1 part by weight or more and 70 parts by weight or less, more preferably 1 part by weight or more and less than 50 parts by weight, and even more preferably 1 part by weight or more and 30 parts by weight or less, with respect to 100 parts by weight of the acrylic polymer. This is because reacting an amine compound with a precursor fiber including both the acrylic polymer and the epoxy group-containing polymer in a preferred range enables the production of an ion-exchange fiber having fiber strength and ion-exchange capacity.

In the introduction process of an ion-exchangeable substituent as the second step, the precursor fiber obtained in the production process of a precursor fiber as the first step is reacted with an amine compound to introduce an ion-exchangeable substituent derived from the amine compound to the acrylic polymer and the epoxy group-containing polymer.

The amine compound may be a compound that can be reacted with at least one of the cyano group in an acrylic polymer, the cyano group and the halogeno group in a modacrylic polymer, and the epoxy group in an epoxy group-containing polymer. The amine compound used for the reaction may be various arbitrary amine compounds, and examples include monoamines having an amino group in total per molecule, polyamines having two or more amino groups in total per molecule, and polyfunctional amines having at least one polar substituent per molecule in addition to the amino group. The type of the amine compound can be appropriately selected in consideration of the type of a chemical substance to be removed and adsorbed from water or the reactivity to the substituent (for example, a cyano group, a halogeno group, or an epoxy group).

Examples of the monoamines having an amino group in total per molecule include trimethylamine, dimethylamine, monomethylamine, triethylamine, diethylamine, ethylamine, dimethylbenzylamine, and diethylbenzylamine. The monoamines may be used singly or in combination of two or more of them.

As the polyamines having two or more amino groups in total per molecule, low molecular weight polyamines are suitably used. Examples of the low molecular weight polyamine include primary diamines such as ethylenediamine, 1,4-diaminobutane, and 1,6-diaminohexane; primary to tertiary diamines such as dimethylaminopropylamine and diethylaminopropylamine; di-primary to secondary amines such as diethylenetriamine, 1,9-diamino-5-azanonane, 1,13-diamino-7-azamidecane, triethylenetetramine, tetraethylenepentamine, and a mixture of oligomeric diaminopolyethyleneimines commercially available under the registered trademark, Polymin; secondary amines such as piperidine, piperazine, di-n-butylamine, and morpholine; and diamines. Polymeric polyamines such as polyethyleneimine and polyallylamine may also be used as the polyamines. These polyamines may be used singly or in combination of two or more of them.

Preferred examples of the low molecular weight polyamine include ethylenediamine, trimethylenediamine, tetramethylenediamine, hexamethylenediamine, triethylenediamine, diethylenetriamine, triethylenetetramine, tetraethylenepentamine, hexamethylenetetramine, pentaethylenehexamine, and hexamethyleneheptamine.

A precursor fiber including the polymer A and the polymer B each having a substituent that can be reacted with an amine is reacted with the low molecular weight polyamine as the amine compound to yield an ion-exchange fiber in which a cross-linked structure is introduced between the polymer A and the polymer B in addition to cross-linkages in the polymer A and the polymer B. This is because such an ion-exchange fiber elutes the polymer A and/or the polymer B having a hydrophilic substituent in a smaller amount.

Examples of the polyfunctional amines having at least one polar substituent per molecule in addition to the amino group include various amino acids such as arginine, lysine, hydroxylysine, histidine, glycine, alanine, valine, leucine, isoleucine, serine, threonine, asparagine, glutamine, cystine, cysteine, methionine, phenylalanine, tyrosine, tryptophan, proline, hydroxyproline, aspartic acid, and glutamic acid; and polyfunctional amine compounds such as N-methyl-D-glucamine (also called "N-methylglucamine"), iminodiacetic acid, phosphophenylamine, ethanolamine, diethanolamine, and diisopropanolamine. These polyfunctional amines may be used singly or in combination of two or more of them.

One or more amine compounds selected from the group consisting of the monoamines, the polyamines, and the polyfunctional amines can be used as the amine compound.

Specifically using any of the various amino acids and the polyfunctional amine compounds having at least one polar substituent in addition the amino group yields an ion-exchange fiber having a chelating substituent that has selectivity to various metal ions and other ions. The ion-exchange fiber produced by such a method can obtain adsorption characteristics suitable for an intended purpose by selecting a substituent depending on the intended purpose.

As the amine compound, an amine compound having two or more amino groups can be selected. Using such an amine compound introduces a cross-linked structure concurrently with the introduction of the ion-exchangeable substituent and thus improves characteristics such as chemical resistance and heat resistance. In particular, in the constitution of the present invention, a cross-linked structure is also introduced between an acrylic polymer as the base polymer and an epoxy group-containing polymer as the blend polymer and the advantageous effect is more readily achieved. The improvement of such characteristics allows the ion-exchange fiber to be more suitably used.

Such an amine compound may also have other substituents in addition to the amino group. The precursor fiber may also be reacted with a reagent capable of being reacted with the acrylic polymer or the epoxy group-containing polymer, concurrently with or after the reaction with such an amine compound. Employing such a method enables the production of a polyfunctional ion-exchange fiber having another ion-exchangeable substituent in addition to the ion-exchangeable substituent derived from an amine compound.

For example, the reactivity of an amino group introduced by the method can be utilized to introduce an additional ion-exchangeable substituent. Examples of such a reaction include introduction of a carboxyl group by a carboxyl group introducing reagent such as a haloacetic acid, introduction of various substituents utilizing amidation, and formation of imine by reaction with an aldehyde or a ketone.

The amine compound preferably contains at least one primary amine as an amino group. This is because the primary amine has higher reactivity than those of a secondary amine and a tertiary amine and thus readily yields an ion-exchange fiber having high ion-exchange capacity.

Here, the reaction of a precursor fiber and an amine compound (in other words, the introduction of an ion-exchangeable substituent to an acrylic polymer and an epoxy-containing polymer included in the precursor fiber) may be carried out in an aqueous solvent. The reaction proceeds by immersing the precursor fiber into an aqueous solution of the amine compound and heating the whole.

The reaction ratio during the introduction of the ion-exchangeable substituent derived from an amine compound can be controlled by the concentration of the amine compound, reaction temperature, and reaction time. A higher concentration of the amine compound, a higher reaction temperature, or a longer reaction time allows the reaction to proceed at a higher ratio and to increase the amount of the amine compound introduced. However, excessive progress of the reaction causes the fiber to be eluted into a reaction solution, and thus it is preferable to select an appropriate reaction condition.

To introduce the ion-exchangeable substituent derived from an amine compound, the temperature condition is required to be 80° C. or higher. In particular, to use a modacrylic polymer as the acrylic polymer, setting the temperature condition to higher than 100° C. causes an amine compound to be reacted not only with an epoxy group but also with a cyano group or a halogeno group in the modacrylic polymer, thus yielding an ion-exchangeable fiber having sufficient ion-exchange capacity. The temperature condition is more preferably 110° C. or higher and even more preferably 120° C. or higher. The upper limit of the temperature condition is preferably about 180° C.

Moreover, the reaction may fail to readily proceed by the condition control alone depending on a type of the amine compound. In such a case, using an aqueous solution of a hydrophilic organic solvent such as an alcohol as the solvent allows the reaction to proceed. Such an organic solvent can be appropriately selected depending on the reactivity of an amine, and examples include methyl alcohol, ethyl alcohol, isopropyl alcohol, ethylene glycol, acetone, methyl ethyl ketone, dimethylformamide, dimethylacetamide, and dimethyl sulfoxide. These hydrophilic organic solvents may be used in combination and a hydrophilic organic solvent may be mixed with water to be used.

A small amount of materials may be reacted in a beaker or any reaction container. For mass production, various reaction containers may be used depending on a purpose or the shape of a fiber. Among them, various dyeing machines are suitably used. For example, to react cut cotton, an Obermaier dyeing machine can be used.

In the present invention, the amino group included in an amine compound reacts with any of a cyano group derived from acrylonitrile in the acrylic polymer, a halogeno group (preferably a chloro group) in an acrylic polymer in which a carbon atom or any atom in the molecule is substituted with a halogen atom (hereinafter called "acrylic polymer having a halogen atom", also called "acrylic polymer containing a halogen atom"), and an epoxy group in the epoxy group-containing polymer. On this account, employing the method of the present invention enables the introduction of an ion-exchangeable substituent in a sufficient amount regardless of the amount of the epoxy group-containing polymer.

In the present invention, the ion-exchangeable substituent derived from an amine compound is introduced, that is, an amine compound is reacted to preferably increase the nitrogen content by 1.0% by weight or more and more preferably 2.0% by weight or more. The nitrogen content in the present invention is the nitrogen content in a fiber determined by elemental analysis. The increasing the nitrogen content is increasing the amount of nitrogen contained during the reaction with an amine compound. The increased amount of nitrogen contained represents the amount of an ion-exchangeable substituent derived from an amine compound introduced and thus the amount is preferably larger.

The ion-exchange fiber in the present invention is preferably a cross-linked acrylic fiber introduced with a cross-linked structure by the reaction of the acrylic polymer with an amine compound and/or by the reaction of the epoxy group-containing polymer with an amine compound. Introducing the cross-linked structure can yield an ion-exchange fiber having practically sufficient chemical resistance and fiber strength. The cross-linked acrylic fiber of the present invention has a fiber strength of 0.8 cN/dtex or more and preferably 1.0 cN/dtex or more. In the present invention, the ion-exchange capacity is 0.8 mmol/g or more, preferably 1.0 mmol/g or more, and more preferably 1.5 mmol/g or more. An ion-exchange fiber having a higher ion-exchange capacity can remove and adsorb a larger amount of chemical substances. Such an ion-exchange fiber achieves sufficient performances of removing and adsorbing chemical substances and also has sufficient strength required for processing into various shapes.

The cross-linked acrylic fiber is, for example, an acrylic fiber having a cross-linked structure (preferably a modacrylic fiber having a cross-linked structure) obtained by reacting an amine compound with a precursor fiber that is obtained by spinning a blend of an acrylic polymer (preferably a modacrylic polymer) and an epoxy group-containing polymer.

In this case, examples of the cross-linking method include a method of using an amine compound having a cross-linkable reactive group (hereinafter simply called "cross-linkable reactive group") that forms a cross-linked structure with an ion-exchangeable substituent by heat or a cross-linking agent and a method of using an acrylic polymer and/or an epoxy group-containing polymer having a cross-linkable reactive group. More specific examples include a method of using polyamines as the amine compound, a method of reacting a precursor fiber with an amine compound in the presence of a cross-linking agent such as glycerin, and a method of using an acrylic polymer having a hydroxy group and an epoxy-containing polymer having a carboxy group to prepare a precursor fiber. The introduction and cross-linking of an ion-exchangeable substituent derived from an amine compound may be carried out at the same time or separately.

In the present invention, an acrylic polymer having a halogen atom is reacted as the acrylic polymer with an amine compound (an ion-exchangeable substituent derived from an amine compound is introduced) to preferably reduce the halogen content by 1.0% by weight or more and more preferably 2.0% by weight or more.

The halogen content in the present invention is the halogen content in a fiber determined by elemental analysis. The reducing the halogen content is reducing the amount of halogen contained during the reaction with an amine compound. This is because, when the acrylic polymer having a halogen atom is, for example, a modacrylic polymer, the amine compound is also reacted with a halogenated vinyl monomer residue in the modacrylic polymer, and thus the reduction in halogen content represents the introduction of an amine compound to a halogenated vinylidene monomer and/or the halogenated vinyl monomer residue. It should be noted that the reactivity of an amine to these monomer residues greatly differs depending on the types of the amine compound. In other words, even when the reduced amount of halogen content is small, sufficient reaction of an amine compound with respect to an acrylonitrile monomer residue or an epoxy group-containing polymer may yield an ion-exchange fiber having high ion-exchange capacity.

The ion-exchange fiber obtained by the production method of the present invention has a feature in which the reduction in fiber strength is small even when an acrylic polymer (especially a modacrylic polymer) is reacted with an amine compound. On this account, the ion-exchange fiber withstands processing into non-woven fabric or spun yarn and can be processed into various shapes such as thread, woven fabric, knitting, braid, and non-woven fabric. In addition, the epoxy group works as a cross-linking agent and thus the method has a feature of yielding an ion-exchange fiber having higher chemical resistance. Furthermore, the amine compound reacts not only with an epoxy group but also with a cyano group and a halogeno group, and this enables the production of an ion-exchange fiber having sufficient ion-exchange capacity.

The epoxy group-containing polymer may have a higher reactivity with an amine compound than those of a cyano group and a halogeno group depending on the type of the amine compound. In such a case, using a small amount of the epoxy group-containing polymer as the blend polymer can greatly improve ion-exchange capacity as compared with the ion-exchange fiber including a modacrylic polymer but including no epoxy group-containing polymer.

[Method for Removing and Adsorbing Chemical Substance in Water]

A method for removing and adsorbing a chemical substance in water of the present invention (hereinafter called "removal and adsorption method of the present invention") is a method of performing removal and adsorption of a chemical substance in water with an ion-exchange fiber and is characterized by using, as the ion-exchange fiber, at least one fiber selected from the ion-exchange fibers of the present invention specifically described above. Using the ion-exchange fiber of the present invention enables the removal and adsorption of a chemical substance not only from water but also from gas.

A typical embodiment of the ion-exchangeable fiber of the present invention includes a polymer A and a polymer B. The polymer A is a polymer obtained by introducing an ion-exchangeable substituent derived from an amine compound to 100 parts by weight of an acrylic polymer that is obtained by polymerization of a monomer composition containing 30% by weight or more of acrylonitrile with respect to 100% by weight of the composition, and the polymer B is a polymer obtained by introducing an ion-exchangeable substituent derived from an amine compound to 1 part by weight or more and 100 parts by weight or less of an epoxy group-containing polymer. A further preferred embodiment uses a modacrylic polymer as the acrylic polymer in the polymer A.

The ion-exchange fiber used in the removal and adsorption method of the present invention is, as described above, obtained by introducing an ion-exchangeable substituent derived from an amine compound to a precursor fiber. The ion-exchange fiber used in the present invention has a high adsorption speed with respect to various chemical substances in water and can efficiently remove and adsorb chemical substances at low concentration.

The removal and adsorption method of the present invention is characterized by exhibiting excellent adsorption speed and absorptivity particularly with respect to chemical substances present at low concentration. The reason why the embodiment of the present invention can more efficiently remove impurities (chemical substances) in water is unclear at the present time but is assumed that the ion-exchange fiber used has a larger specific surface area than that of common ion-exchange resin beads and that the precursor fiber is reacted with an amine compound to yield an ion-exchange fiber having an appropriate cross-linked structure and substituent distribution.

The chemical substance capable of being removed from water by the removal and adsorption method of the present invention is not particularly limited, and examples include an ionic chemical substance and a nonionic chemical substance. Appropriately selecting the type of an amine compound depending on the type of such a chemical substance allows the removal and adsorption method of the present invention to efficiently remove and adsorb the chemical substance. Such a chemical substance can be adsorbed to the ion-exchange fiber through an ionic bond, a hydrogen bond, a coordinate bond, an electrostatic interaction, or other interactions or bonds between the chemical substance and the ion-exchange fiber used in the present invention.

The ionic chemical substance is an organic compound containing an ion. Examples of the ion include, but are not necessarily limited to, anions such as a halide ion, a polyhalide ion, and an oxoacid ion and complex ions of them; and ions of heavy metals belonging to the group III to XVI in the periodic table and complex ions of them, and ions of heavy metallic elements such as lanthanoids and actinoids and complex ions of them. One or more ionic chemical substances may be contained in water to be subjected to the removal and adsorption. Combination use of two or more ion-exchange fibers having different ion-exchangeable substituents from each other enables simultaneous removal and adsorption of a plurality of ionic chemical substances in water. The nonionic chemical substance may be any organic compound containing no ion, and examples include oligomers, polymers, and organic compounds having at least one substituent that is bonded to any atom capable of having a substituent, such as a carbon atom.

Among them, for an ionic chemical substance as the chemical substance, using any amine compound having an ionic substituent enables efficient adsorption of the chemical substance.

For example, using an ion-exchange fiber introduced with an ion-exchangeable substituent derived from a polyamine as the amine compound enables removal of iodide ions in water. In this case, using an oxidizing agent to convert the iodide ions into iodine and/or a polyiodide ion and then using the ion-exchange fiber enable high speed and high efficiency removal and adsorption of the iodide ions.

The oxidizing agent used here may be any agent capable of oxidizing iodide ions into iodine and/or a polyiodide ion, and specifically suitable examples include sodium hypochlorite, chlorine, and hydrogen peroxide.

In such a constitution, iodine and/or a polyiodide ion formed by the reaction shown in (Formula 1) and (Formula 2) are immediately removed and adsorbed to shift the equilibrium, and the remaining iodide ions are sequentially transformed into an iodine molecule and/or a polyiodide ion. This enables high speed and high efficient removal and adsorption of iodide ions. At this time, iodine constituting the iodide ions may be radioactive iodines as radioactive isotopes, such as $^{131}I$, $^{129}I$, and $^{123}I$ or may be $^{127}I$ (stable isotope), and any isotope can be removed and adsorbed in a similar manner.

$$2I^- \rightarrow I_2 + 2e^- \quad \text{(Formula 1)}$$

$$nI_2 + I^- \rightarrow I_{2n+1}^- \quad \text{(Formula 2)}$$

The ion-exchange fiber used here preferably has a large saturated adsorption amount of iodine. The saturated adsorption amount of iodine is preferably 100 g/kg or more, more preferably 300 g/kg or more, and even more preferably 500 g/kg or more. Using an ion-exchange fiber having a large saturated adsorption amount of iodine enables efficient adsorption of a polyiodide ion. Here, the saturated adsorption amount of iodine is a maximum amount of iodine capable of being adsorbed to 1 kg of fiber.

The ions contained in the ionic chemical substance may be a heavy metal ion or a complex ion of a heavy metal. Appropriately selecting the type of an amine compound depending on the type of a heavy metal ion enables highly selective removal and adsorption of heavy metal ions in addition to adsorption speed and absorptivity at low concentration.

[Device for Removing and Adsorbing Chemical Substance in Water]

A device for removing and adsorbing a chemical substance in water of the present invention (hereinafter called "adsorption and removal device of the present invention") is characterized by including an adsorbent containing at least one fiber selected from the group consisting of the ion-exchange fibers of the present invention having the various constitutions.

A typical embodiment of the ion-exchangeable fiber of the present invention includes a polymer A and a polymer B. The polymer A is a polymer obtained by introducing an ion-exchangeable substituent derived from an amine compound to 100 parts by weight of an acrylic polymer that is obtained by polymerization of a monomer composition containing 30% by weight or more of acrylonitrile with respect to 100% by weight of the composition, and the polymer B is a polymer obtained by introducing an ion-exchangeable substituent derived from an amine compound to 1 part by weight or more and 100 parts by weight or less of an epoxy group-containing polymer. A further preferred embodiment uses a modacrylic polymer as the acrylic polymer in the polymer A.

The adsorbent in the adsorption and removal device of the present invention may have any shape containing the ion-exchange fiber of the present invention, and examples of the shape include the shapes of common textile products such as thread, woven fabric, knitting, braid, and nonwoven fabric and various filter shapes. A precursor fiber is not necessarily formed into a thread shape but into a sheet shape to be used as, for example, a sheet and a film. The sheet or the film may be formed into a porous structure by mixing water-soluble inorganic particles, forming a shape, and then immersing the formed sheet or film in water to dissolve and remove the inorganic particles, during the formation.

The adsorbent in such a shape may be used without treatment or may be stored in a container that is made of a liquid permeable material to be used. Examples of such a container include a paper bag, a cloth bag, a container having a plurality of holes and made of, for example, metal, ceramics, glass, and a synthetic resin, and a container having a filter.

The adsorption and removal device of the present invention may be any device including an adsorbent and a storage container that has an inner space capable of storing the adsorbent and water containing chemical substances and includes an apparatus or device enabling water supply and drainage (for example, a water supply and drainage pump). Examples of the device include an adsorption column that is a column filled with a thready adsorbent, an adsorption cartridge in which an adsorbent in the shape of, for example, non-woven fabric, woven fabric, and knitting are interposed in a cartridge, and an adsorption machine integrating them.

EXAMPLES

The present invention will be specifically described with reference to examples hereinafter but is not intended to be limited to them. Before the description of examples, definitions of measurement methods and others will be described.

<Measurement of Fiber Strength>

A tensilon meter (trade name: RTC-1210A, manufactured by ORIENTEC Co., Ltd.) was used for measurement. For the processing into non-woven fabric, spun yarn, and other shapes, a fiber is required to have a fiber strength of 0.8 cN/dtex or more.

<Measurement of Ion-Exchange Capacity>

First, an ion-exchange fiber was treated to be modified into a standard type by a method described in "Manual 1 of DIAION: Ion Exchange Resin-Synthetic Absorbent" (Mitsubishi Chemical Corporation, 1995, p. 136).

Next, the ion-exchange fiber modified into a standard type was used and the ion-exchange capacity was determined by a method described in "Manual 1 of DIAION: Ion Exchange Resin-Synthetic Absorbent." An ion-exchange fiber having a larger ion-exchange capacity is preferred because such an ion-exchange fiber can adsorb a larger amount of an electrolyte. In order to efficiently adsorb an electrolyte in treatment water, the practical ion-exchange capacity is preferably 0.8 mmol/g or more, more preferably 1.0 mmol/g or more, and even more preferably 1.5 mmol/g or more.

<Measurement of Nitrogen Content>

The nitrogen content was determined with an elemental analyzer (trade name: JM10, manufactured by J-Science Lab Co., Ltd.). The nitrogen contents before and after the reaction with an amine compound were determined, and the increase in nitrogen content was calculated from the difference between the determined contents.

<Measurement of Halogen Content>

The halogen content was determined by burning a sample with a combustion apparatus (trade name: QF02, manufactured by Mitsubishi Chemical Analytech Co., Ltd.), then using sodium hydroxide to adsorb a halogen liberated as a hydrogen halide, and quantitatively determining the halogen content with an ion chromatograph (trade name: IC-2010, manufactured by Tosoh Corporation). The halogen contents before and after the reaction with an amine compound were determined, and the reduction in halogen content was calculated from the difference between the determined contents.

<Measurement of Saturated Adsorption Amount of Iodine>

In 20 g of 0.05N iodine standard solution, 0.2 g of an adsorbent was immersed and the whole was left for three days. Then, 2 mL of a supernatant liquid was collected and 10 mL of ion-exchanged water and starch solution were added. The solution was titrated with 0.01N aqueous sodium thiosulfate solution to determine the iodine concentration of the supernatant liquid. From the result, the saturated adsorption amount of iodine was calculated in accordance with (Formula 3) below.

$$A=(0.05-a)\times 253.8\times 20/0.2 \quad \text{(Formula 3)}$$

(A: saturated adsorption amount of iodine, a: iodine concentration of supernatant liquid after adsorption)

In the present specification, the saturated adsorption amount of iodine is represented in terms of g/kg, and 1 g/kg represents that 1 kg of an adsorbent can adsorb 1 g of iodine in a saturated state.

Example 1

In acetone, 100 parts by weight of a modacrylic polymer containing 56% by weight of acrylonitrile, 42% by weight of vinyl chloride, and 2% by weight of sodium p-styrenesulfonate and 67 parts by weight of polyglycidyl methacrylate (hereinafter also called "PGMA") were dissolved to yield a spinning dope having a stock concentration of 30% by weight. The spinning dope was subjected to wet spinning to yield a precursor fiber. Next, 5 g of the precursor fiber was reacted in 200 g of 60% by weight aqueous triethylenetetramine solution at 120° C. for 6 hours to yield an ion-exchange fiber. The ion-exchange fiber had an ion-exchange capacity of 4.67 mmol/g, a fiber strength of 1.12 cN/dtex, an increase in nitrogen content of 6.9% by weight, and a reduction in halogen content of 20.5% by weight.

Example 2

An ion-exchange fiber was obtained in a similar manner to that in Example 1 except that 100 parts by weight of the modacrylic polymer and 25 parts by weight of polyglycidyl methacrylate were used to prepare the precursor fiber. The ion-exchange fiber had an ion-exchange capacity of 4.45 mmol/g, a fiber strength of 1.22 cN/dtex, an increase in nitrogen content of 6.6% by weight, and a reduction in halogen content of 15.7% by weight.

Example 3

An ion-exchange fiber was obtained in a similar manner to that in Example 1 except that 100 parts by weight of the modacrylic polymer and 10 parts by weight of polyglycidyl methacrylate were used to prepare the precursor fiber. The ion-exchange fiber had an ion-exchange capacity of 4.39 mmol/g, a fiber strength of 1.33 cN/dtex, an increase in nitrogen content of 6.6% by weight, and a reduction in halogen content of 12.9% by weight.

Example 4

An ion-exchange fiber was obtained in a similar manner to that in Example 1 except that 100 parts by weight of the modacrylic polymer and 5 parts by weight of polyglycidyl methacrylate were used to prepare the precursor fiber. The ion-exchange fiber had an ion-exchange capacity of 4.35 mmol/g, a fiber strength of 1.22 cN/dtex, an increase in nitrogen content of 6.4% by weight, and a reduction in halogen content of 13.5% by weight.

Example 5

An ion-exchange fiber was obtained in a similar manner to that in Example 1 except that 100 parts by weight of the modacrylic polymer and 1 part by weight of polyglycidyl methacrylate were used to prepare the precursor fiber. The ion-exchange fiber had an ion-exchange capacity of 4.30 mmol/g, a fiber strength of 1.10 cN/dtex, an increase in nitrogen content of 6.4% by weight, and a reduction in halogen content of 13.5% by weight.

Example 6

A precursor fiber was prepared in a similar manner to that in Example 1. Next, 5 g of the precursor fiber was reacted in 22.9% by weight aqueous cysteine solution at 120° C. for 6 hours to yield an ion-exchange fiber. The ion-exchange fiber had an ion-exchange capacity of 3.57 mmol/g, a fiber strength of 1.01 cN/dtex, an increase in nitrogen content of 3.5% by weight, and a reduction in halogen content of 15.3% by weight.

Example 7

An ion-exchange fiber was obtained in a similar manner to that in Example 6 except that 100 parts by weight of the modacrylic polymer and 43 parts by weight of polyglycidyl methacrylate were used to prepare the precursor fiber. The ion-exchange fiber had an ion-exchange capacity of 2.68 mmol/g, a fiber strength of 1.16 cN/dtex, an increase in nitrogen content of 3.2% by weight, and a reduction in halogen content of 12.5% by weight.

Example 8

An ion-exchange fiber was obtained in a similar manner to that in Example 6 except that 100 parts by weight of the modacrylic polymer and 25 parts by weight of polyglycidyl methacrylate were used to prepare the precursor fiber. The ion-exchange fiber had an ion-exchange capacity of 1.92 mmol/g, a fiber strength of 1.23 cN/dtex, an increase in nitrogen content of 2.5% by weight, and a reduction in halogen content of 9.4% by weight.

Example 9

An ion-exchange fiber was obtained in a similar manner to that in Example 6 except that 100 parts by weight of the modacrylic polymer and 5 parts by weight of polyglycidyl methacrylate were used to prepare the precursor fiber. The ion-exchange fiber had an ion-exchange capacity of 1.37 mmol/g, a fiber strength of 1.42 cN/dtex, an increase in nitrogen content of 2.1% by weight, and a reduction in halogen content of 8.0% by weight.

Example 10

The precursor fiber was prepared in a similar manner to that in Example 2. Next, 5 g of the precursor fiber was reacted in 18.4% by weight aqueous iminodiacetic acid solution at 120° C. for 6 hours to yield an ion-exchange fiber. The ion-exchange fiber had an ion-exchange capacity of 1.69 mmol/g, a fiber strength of 1.27 cN/dtex, an increase in nitrogen content of 3.0% by weight, and a reduction in halogen content of 3.7% by weight.

Example 11

An ion-exchange fiber was obtained in a similar manner to that in Example 10 except that 100 parts by weight of the modacrylic polymer and 5 parts by weight of polyglycidyl methacrylate were used to prepare the precursor fiber. The ion-exchange fiber had an ion-exchange capacity of 1.12 mmol/g, a fiber strength of 1.45 cN/dtex, an increase in nitrogen content of 2.0% by weight, and a reduction in halogen content of 2.5% by weight.

Comparative Example 1

An ion-exchange fiber was obtained in a similar manner to that in Example 1 except that polyglycidyl methacrylate was not used to prepare the precursor fiber. The ion-exchange fiber had an ion-exchange capacity of 4.26 mmol/g but the fiber strength was too low to be determined with a tensilon meter. The increase in nitrogen content was 6.3% by weight and the reduction in halogen content was 15.8% by weight.

Comparative Example 2

The precursor fiber was obtained in a similar manner to that in Comparative Example 1. Next, 5 g of the precursor fiber was reacted in 22.9% by weight aqueous cysteine solution at 120° C. for 6 hours to yield an ion-exchange fiber. The ion-exchange fiber had an ion-exchange capacity of 0.25 mmol/g, a fiber strength of 1.83 cN/dtex, an increase in nitrogen content of 0.3% by weight, and a reduction in halogen content of 0.3% by weight.

Comparative Example 3

The precursor fiber was obtained in a similar manner to that in Comparative Example 1. Next, 5 g of the precursor fiber was reacted in 18.4% by weight aqueous iminodiacetic acid solution at 120° C. for 6 hours to yield an ion-exchange fiber. The ion-exchange fiber had an ion-exchange capacity of 0.08 mmol/g, a fiber strength of 1.65 cN/dtex, an increase in nitrogen content of 0.4% by weight, and a reduction in halogen content of 0.6% by weight.

Comparative Example 4

An acrylic polymer containing 93% by weight of acrylonitrile and 7% by weight of methyl acrylate was subjected to wet spinning by a known method to prepare a precursor fiber. Next, 5 g of the precursor fiber was reacted in a similar condition to that in Example 1 to yield an ion-exchange fiber. The ion-exchange fiber had an ion-exchange capacity of 4.68 mmol/g, a fiber strength of 2.32 cN/dtex, and an increase in nitrogen content of 7.0% by weight.

Comparative Example 5

An ion-exchange fiber was obtained in a similar manner to that in Example 1 except that the reaction with triethylenetetramine was carried out at a reaction temperature of 80° C. The ion-exchange fiber had an ion-exchange capacity of 0.21 mmol/g, a fiber strength of 1.88 cN/dtex, an increase in nitrogen content of 0.3% by weight, and a reduction in halogen content of 0.2% by weight.

Table 1 summarizes the ion-exchange capacities, the fiber strengths, and other properties of the ion-exchange fibers obtained in Examples 1 to 11 and Comparative Examples 1 to 5.

TABLE 1

| | | Base polymer | | Blend polymer | | | Ion-exchange fiber | | | |
|---|---|---|---|---|---|---|---|---|---|---|
| | | Type | Blending amount (parts by weight) | Type | Blending amount (parts by weight) | Amine compound | Ion-exchange capacity (mmol/g) | Fiber strength (cN/dtex) | Increase in nitrogen content (% by weight) | Decrease in chlorine content (% by weight) |
| Example | 1 | Modacrylic polymer | 100 | PGMA | 67 | Triethylenetetramine | 4.67 | 1.12 | 6.9 | 20.5 |
| | 2 | Modacrylic polymer | 100 | PGMA | 25 | Triethylenetetramine | 4.45 | 1.22 | 6.6 | 15.7 |
| | 3 | Modacrylic polymer | 100 | PGMA | 10 | Triethylenetetramine | 4.39 | 1.33 | 6.6 | 12.9 |
| | 4 | Modacrylic polymer | 100 | PGMA | 5 | Triethylenetetramine | 4.35 | 1.22 | 6.4 | 13.5 |
| | 5 | Modacrylic polymer | 100 | PGMA | 1 | Triethylenetetramine | 4.30 | 1.10 | 6.4 | 13.5 |
| | 6 | Modacrylic polymer | 100 | PGMA | 67 | Cysteine | 3.57 | 1.01 | 3.5 | 15.3 |
| | 7 | Modacrylic polymer | 100 | PGMA | 43 | Cysteine | 2.68 | 1.16 | 3.2 | 12.5 |
| | 8 | Modacrylic polymer | 100 | PGMA | 25 | Cysteine | 1.92 | 1.23 | 2.5 | 9.4 |
| | 9 | Modacrylic polymer | 100 | PGMA | 5 | Cysteine | 1.37 | 1.42 | 2.1 | 8.0 |
| | 10 | Modacrylic polymer | 100 | PGMA | 25 | Iminodiacetic acid | 1.69 | 1.27 | 3.0 | 3.7 |
| | 11 | Modacrylic polymer | 100 | PGMA | 5 | Iminodiacetic acid | 1.12 | 1.45 | 2.0 | 2.5 |
| Comparative Example | 1 | Modacrylic polymer | 100 | PGMA | 0 | Triethylenetetramine | 4.26 | Not determined | 6.3 | 15.8 |
| | 2 | Modacrylic polymer | 100 | PGMA | 0 | Cysteine | 0.07 | 2.03 | 0.0 | 0.0 |
| | 3 | Modacrylic polymer | 100 | PGMA | 0 | Iminodiacetic acid | 0.02 | 1.92 | 0.0 | 0.0 |
| | 4 | Acrylic polymer | 100 | PGMA | 0 | Triethylenetetramine | 4.68 | 2.32 | 7.0 | — |
| | 5 | Modacrylic polymer | 100 | PGMA | 0 | Triethylenetetramine | 0.21 | 1.88 | 0.3 | 0.2 |

Table 1 reveals that each ion-exchange fiber of the present invention had sufficient exchange capacity and fiber strength. In contrast, the reaction of the precursor fiber containing no polyglycidyl methacrylate with triethylenetetramine yielded the ion-exchange fiber having a sufficient exchange capacity but having a low fiber strength and failed to yield an ion-exchange fiber having sufficient processability. The precursor fiber containing no polyglycidyl methacrylate was insufficiently reacted with cysteine or iminodiacetic acid to yield the ion-exchange fiber having a low exchange capacity and failed to yield an ion-exchange fiber suitable for practical use.

As apparent from Comparative Example 5, the a modacrylic polymer was hardly reacted with an amine compound at a reaction temperature of 100° C. or lower and failed to yield an ion-exchange fiber having a sufficient ion-exchange capacity.

These results reveal that the method of the present invention can produce an ion-exchange fiber having practically sufficient exchange capacity and fiber strength even by using the modacrylic fiber having high chemical resistance as the precursor fiber.

Production Examples 1 to 6

Preparation of Precursor Fiber

First, as shown in Table 2, as necessary, an acrylic polymer or a modacrylic polymer was blended with polyglycidyl methacrylate as an epoxy group-containing polymer. The mixture was dissolved in dimethyl sulfoxide to afford each spinning dope. Next, each spinning dope was subjected to wet spinning to yield an acrylic fiber or a modacrylic fiber as the precursor fiber. These precursor fibers are regarded as precursor fibers A to F (Production Examples 1 to 6).

at 120° C. for 6 hours to yield an ion-exchange fiber. In the reaction, the concentration of an amine compound in an aqueous solution is 60% by weight for triethylenetetramine, 18.4% by weight for iminodiacetic acid, 30.53% by weight for N-methylglucamine, or 16.51% by weight for cysteine.

Examples 12 to 20

Comparative Examples 6 to 12

The ion-exchange capacity, the fiber strength, the nitrogen content, the chlorine content, and the saturated adsorption amount of iodine of each of the ion-exchange fibers 1 to 16 obtained in Production Examples 7 to 22 were evaluated. The experiments performed by using the ion-exchange fibers 1 to

TABLE 2

| Production Example | Precursor fiber | Base polymer | | | | | Blend polymer | |
|---|---|---|---|---|---|---|---|---|
| | | Type | Composition | | | Blending amount (parts by weight) | Type | Blending amount (parts by weight) |
| | | | Monomer 1 | Monomer 2 | Monomer 3 | | | |
| 1 | A | Acrylic polymer | Acrylonitrile, 93% by weight | Methyl acrylate, 7% by weight | — | 100 | PGMA | 25 |
| 2 | B | Modacrylic polymer | Acrylonitrile, 56% by weight | Vinyl chloride, 42% by weight | Sodium p-styrenesulfonate, 2% by weight | 100 | PGMA | 40 |
| 3 | C | Modacrylic polymer | Acrylonitrile, 56% by weight | Vinyl chloride, 42% by weight | Sodium p-styrenesulfonate, 2% by weight | 100 | PGMA | 25 |
| 4 | D | Modacrylic polymer | Acrylonitrile, 56% by weight | Vinyl chloride, 42% by weight | Sodium p-styrenesulfonate, 2% by weight | 95 | PGMA | 1 |
| 5 | E | Acrylic polymer | Acrylonitrile, 93% by weight | Methyl acrylate, 7% by weight | — | 100 | — | 0 |
| 6 | F | Modacrylic polymer | Acrylonitrile, 56% by weight | Vinyl chloride, 42% by weight | Sodium p-styrenesulfonate, 2% by weight | 100 | — | 0 |

Production Examples 7 to 22

Next, the precursor fibers A to F prepared in Production Examples 1 to 6 were reacted with an amine compound to yield ion-exchange fibers 1 to 16 (Production Examples 7 to 22). The amine compound used was triethylenetetramine, iminodiacetic acid, N-methylglucamine, or cysteine.

For the reaction with an amine compound, 5 g of a precursor fiber was reacted in 200 g of aqueous solution containing the amine compound having a predetermined concentration 9 correspond to Examples 12 to 20 and the experiments performed by using the ion-exchange fibers 10 to 16 correspond to Comparative Examples 6 to 12. Table 3 shows these production conditions and results. Table 3 also shows the saturated adsorption amount of iodine of each ion-exchange fiber produced by using triethylenetetramine. Example 19 and Comparative Example 4 are the same as Example 1 and Comparative Example 1, respectively, but are shown again to indicate the saturated adsorption amounts of iodine.

TABLE 3

| | | Production Example | Ion-exchange fiber | Precursor fiber | Amine compound | Ion-exchange capacity (mmol/g) | Fiber strength (cN/dtex) | Increase in nitrogen content (% by weight) | Reduction in chlorine content (% by weight) | Saturated adsorption amount of iodine (g/kg) |
|---|---|---|---|---|---|---|---|---|---|---|
| Example | 12 | 7 | 1 | A | Iminodiacetic acid | 1.54 | 1.42 | 2.3 | — | — |
| | 13 | 8 | 2 | A | N-methylglucamine | 0.72 | 1.58 | 6.2 | — | — |
| | 14 | 9 | 3 | A | Cysteine | 1.72 | 1.32 | 3.1 | — | — |
| | 15 | 10 | 4 | C | Iminodiacetic acid | 1.4 | 1.06 | 2.9 | 8.5 | — |
| | 16 | 11 | 5 | C | N-methylglucamine | 1.33 | 1.12 | 5.6 | 7.8 | — |
| | 17 | 12 | 6 | C | Cysteine | 1.65 | 1.18 | 3.3 | 5.6 | — |
| | 18 | 13 | 7 | B | Triethylenetetramine | 4.67 | 1.12 | 6.9 | 20.5 | 948 |
| | 19 | 14 | 8 | C | Triethylenetetramine | 4.45 | 1.22 | 6.6 | 15.7 | 852 |
| | 20 | 15 | 9 | D | Triethylenetetramine | 4.3 | 1.10 | 6.4 | 13.5 | 803 |
| Comparative Example | 6 | 16 | 10 | E | Iminodiacetic acid | — | — | — | — | — |
| | 7 | 17 | 11 | E | N-methylglucamine | — | — | — | — | — |
| | 8 | 18 | 12 | E | Cysteine | — | — | — | — | — |

TABLE 3-continued

| Production Example | Ion-exchange fiber | Precursor fiber | Amine compound | Ion-exchange capacity (mmol/g) | Fiber strength (cN/dtex) | Increase in nitrogen content (% by weight) | Reduction in chlorine content (% by weight) | Saturated adsorption amount of iodine (g/kg) |
|---|---|---|---|---|---|---|---|---|
| 9 | 19 | 13 | F | Triethylenetetramine | 4.26 | Not determined | 6.3 | 15.8 | 832 |
| 10 | 20 | 14 | F | Iminodiacetic acid | 0.02 | 1.92 | 0.1 | 0 | — |
| 11 | 21 | 15 | F | N-methylglucamine | 0.05 | 1.88 | 0.0 | 0 | — |
| 12 | 22 | 16 | F | Cysteine | 0.07 | 2.03 | 0.0 | 0 | — |

As apparent from these results, each of the ion-exchange fibers 1 to 9 of Examples 12 to 20 (Production Examples 7 to 15) produced by the method of the present invention had sufficient ion-exchange capacity and fiber strength. Comparative Examples 6 to 8 (Production Examples 16 to 18) show the production results of ion-exchange fibers 10 to 12 that were produced by using an acrylic fiber containing no epoxy group-containing polymer as the precursor fiber, but each fiber became soluble in water during the reaction to fail to produce an ion-exchange fiber. In contrast, as shown in Examples 12 to 14 (Production Examples 7 to 9), the acrylic fiber containing an epoxy group-containing polymer was able to be used as the precursor fiber to yield ion-exchange fibers 1 to 3 having sufficient strength and ion-exchange capacity.

Comparative Examples 9 to 12 (Production Examples 19 to 22) show the production results of ion-exchange fibers 13 to 16 that were produced by using the modacrylic fiber containing no epoxy group-containing polymer as the precursor fiber. The precursor fiber was hardly reacted with the amine compounds shown in Comparative Examples 10 to 12 (Production Examples 20 to 22) and failed to yield an ion-exchange fiber having sufficient ion-exchange capacity. As shown in Comparative Example 9 (Production Example 19), using triethylenetetramine as the amine compound enabled the production of an ion-exchange fiber, which had insufficient fiber strength to be determined. In contrast, as shown in Examples 15 to 20 (Production Examples 10 to 15), using the modacrylic fiber containing an epoxy group-containing polymer as the precursor fiber enabled the production of an ion-exchange fiber having sufficient fiber strength.

<Other Adsorbents>

In order to compare the polyiodide ion absorptivity of the ion-exchange fiber of the present invention, the activated carbon, the zeolite, the ion-exchange resin, and the inorganic adsorbent below were used.

The activated carbon used was silver-impregnated activated carbon (product name: T-S, manufactured by Kuraray Chemical Co., Ltd., saturated adsorption amount of iodine: 644 g/kg). The zeolite used was silver-impregnated zeolite (product name: Zeolum A3, manufactured by Tosoh Corporation, saturated adsorption amount of iodine: 0.03 g/kg). The ion-exchange resin used was an ion-exchange resin (product name: MC-850, manufactured by Sumika Chemtex Co., Ltd., saturated adsorption amount of iodine: 500 g/kg). The inorganic adsorbent used was a cerium hydroxide adsorbent (product name: READ-F, manufactured by Nihonkaisui Co., Ltd., saturated adsorption amount of iodine: 0.05 g/kg).

In order to compare the lead(II) ion absorptivity of the ion-exchange fiber of the present invention, an ion-exchange resin (product name: MC-700, manufactured by Sumika Chemtex Co., Ltd.) was used. In order to compare the borate ion absorptivity of the ion-exchange fiber of the present invention, a cerium hydroxide adsorbent (product name: READ-B, manufactured by Nihonkaisui Co., Ltd.) was used as an inorganic adsorbent.

Examples 21 to 23Comparative Examples 13 to 16

Adsorption of Iodide Ion

Potassium iodide was dissolved in seawater to prepare an iodide ion standard solution containing 35 ppm iodide ion. To 15 g of the standard solution, 0.15 g of each of the ion-exchange fibers 7 to 9 (Examples 21 to 23) produced in Production Examples 13 to 15 was added, and 0.2 g of 30% aqueous hydrogen peroxide was added in an acidic condition with hydrochloric acid. As Comparative Examples, to the standard solution, 0.15 g of any adsorbent of activated carbon (Comparative Example 13), zeolite (Comparative Example 14), an ion-exchange resin (Comparative Example 15), and an inorganic adsorbent (Comparative Example 16) was added, and 0.2 g of 30% aqueous hydrogen peroxide was added in an acidic condition with hydrochloric acid. Each mixture was stirred at room temperature and was filtrated after 5 minutes, 10 minutes, 30 minutes, 60 minutes, and 11 hours to remove the adsorbent. The remaining amount of iodide ion was quantitatively determined by ion chromatography at each time. In addition, the iodine adsorption amount at each time was quantitatively determined by titration similar to the quantitative determination of the saturated adsorption amount of iodine. From these measurement results, the concentrations of iodide ion and iodine in the filtrate at each time were determined and were compared to the initial concentrations to calculate the total iodine adsorption ratio at each time. The total iodine adsorption ratio was calculated in accordance with (Formula 4) below.

$$\text{Total iodine adsorption ratio (\%)} = [C_0 - (C_{I^-} + C_{I2} \times 2)] \times 100 / C_0 \quad \text{(Formula 4)}$$

(In Formula, $C_{I^-}$ is iodide ion concentration, $C_{I2}$ is iodine concentration, and $C_0$ is initial iodide ion concentration)

Figure 2:
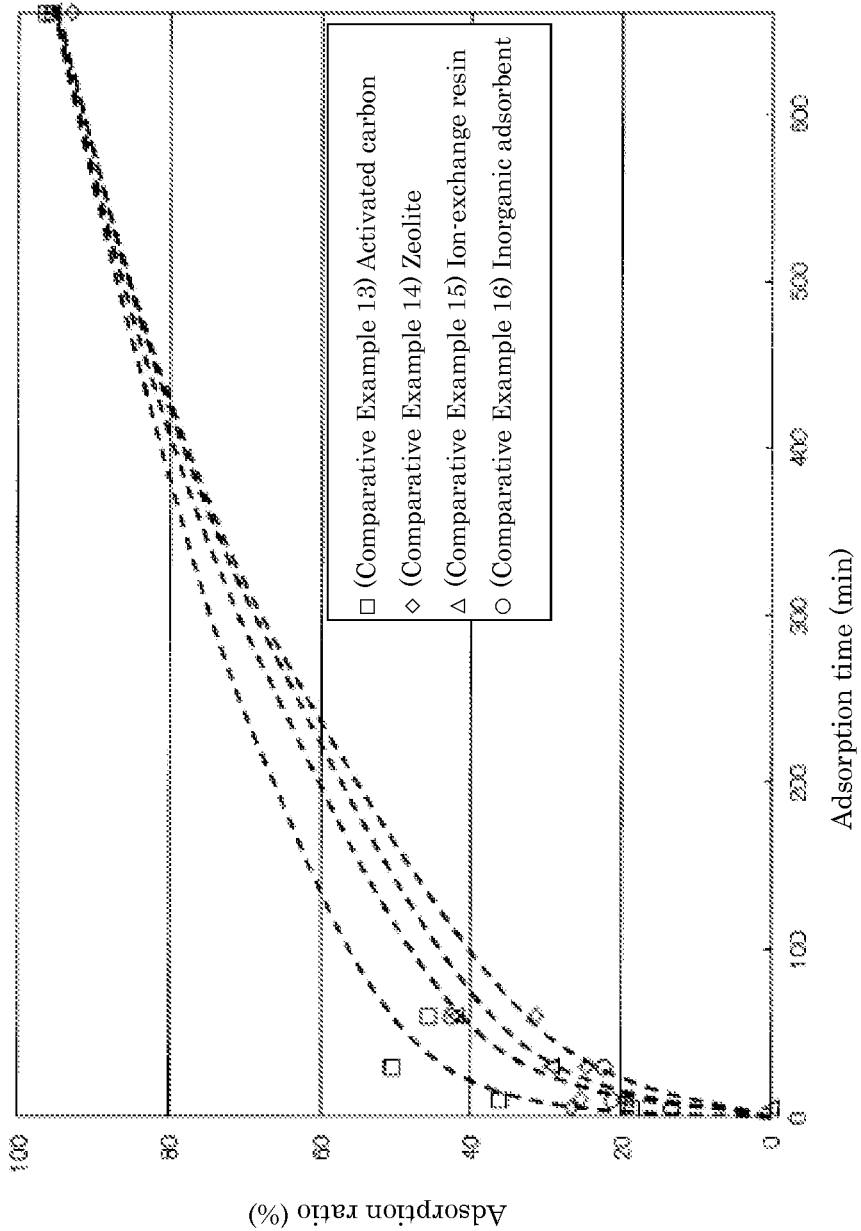
FIG. 2 is a graph showing results of Comparative Examples 13 to 16.

Table 4 shows the concentrations of iodide ion and iodine in the filtrate at each time. Table 5 shows the total iodine adsorption ratio at each time calculated from these values. FIG. 1 is a graph showing the results of Examples 21 to 23, and FIG. 2 is a graph showing the results of Comparative Examples 13 to 16.

TABLE 4

| | | Remaining amount (ppm) | | | | | | | | |
|---|---|---|---|---|---|---|---|---|---|---|
| | | After 5 minutes | | After 10 minutes | | After 30 minutes | | After 60 minutes | | After 11 hours | |
| | Adsorbent | $I^-$ | $I_2$ | $I^-$ | $I_2$ | $I^-$ | $I_2$ | $I^-$ | $I_2$ | $I^-$ | $I_2$ |
| Example | 21 Ion-exchange fiber 7 | 2.1 | 2.5 | 1.2 | 1.3 | 1.0 | 1.0 | 0.98 | 0.92 | 0.80 | 0.12 |
| | 22 Ion-exchange fiber 8 | 2.4 | 2.5 | 1.3 | 1.5 | 1.2 | 1.3 | 1.1 | 0.85 | 1.0 | 0.21 |
| | 23 Ion-exchange fiber 9 | 2.8 | 3.5 | 1.9 | 1.8 | 1.3 | 1.3 | 1.2 | 0.77 | 1.0 | 0.15 |
| Comparative Example | 13 Activated carbon | 10 | 8.85 | 5.6 | 8.04 | 4.6 | 6.17 | 4.9 | 6.82 | 0.6 | 0.32 |
| | 14 Zeolite | 7 | 9.01 | 7.2 | 9.09 | 8.9 | 8.36 | 7.8 | 7.79 | 1.3 | 0.5 |
| | 15 Ion-exchange resin | 18 | 8.61 | 11 | 8.2 | 11 | 6.5 | 10 | 4.87 | 1.3 | 0.06 |
| | 16 Inorganic adsorbent | 8.5 | 10.5 | 9 | 8.93 | 9.9 | 8.28 | 5.6 | 6.98 | 1.2 | 0.14 |

TABLE 5

| | | Total iodine adsorption ratio (%) | | | | |
|---|---|---|---|---|---|---|
| | Adsorbent | After 5 minutes | After 10 minutes | After 30 minutes | After 60 minutes | After 11 hours |
| Example | 21 Ion-exchange fiber 7 | 79.1 | 88.8 | 91.2 | 91.7 | 96.9 |
| | 22 Ion-exchange fiber 8 | 78.2 | 87.4 | 88.8 | 91.8 | 95.8 |
| | 23 Ion-exchange fiber 9 | 71.2 | 83.8 | 88.5 | 91.9 | 96.2 |
| Comparative Example | 13 Activated carbon | 18.5 | 36.2 | 50.2 | 45.5 | 96.3 |
| | 14 Zeolite | 26.4 | 25.3 | 24.6 | 31.2 | 93.2 |
| | 15 Ion-exchange resin | 0 | 19.4 | 29.4 | 41.9 | 95.8 |
| | 16 Inorganic adsorbent | 13.2 | 21 | 22.2 | 42.5 | 95.7 |

As apparent from the results, the iodide ion adsorption by the method of the present invention achieved a total iodine adsorption ratio of 90% or more within 60 minutes. In contrast, the iodide ion adsorption by other embodiments than the method of the present invention required 10 hours or more to achieve a total iodine adsorption ratio of 90% or more. These results reveal that the method of the present invention can be used to achieve rapid and highly efficient removal and adsorption of iodide ions.

Examples 24 and 25 and Comparative Examples 17 and 18

Adsorption of Lead(II) Ion (1)

Figure 3:
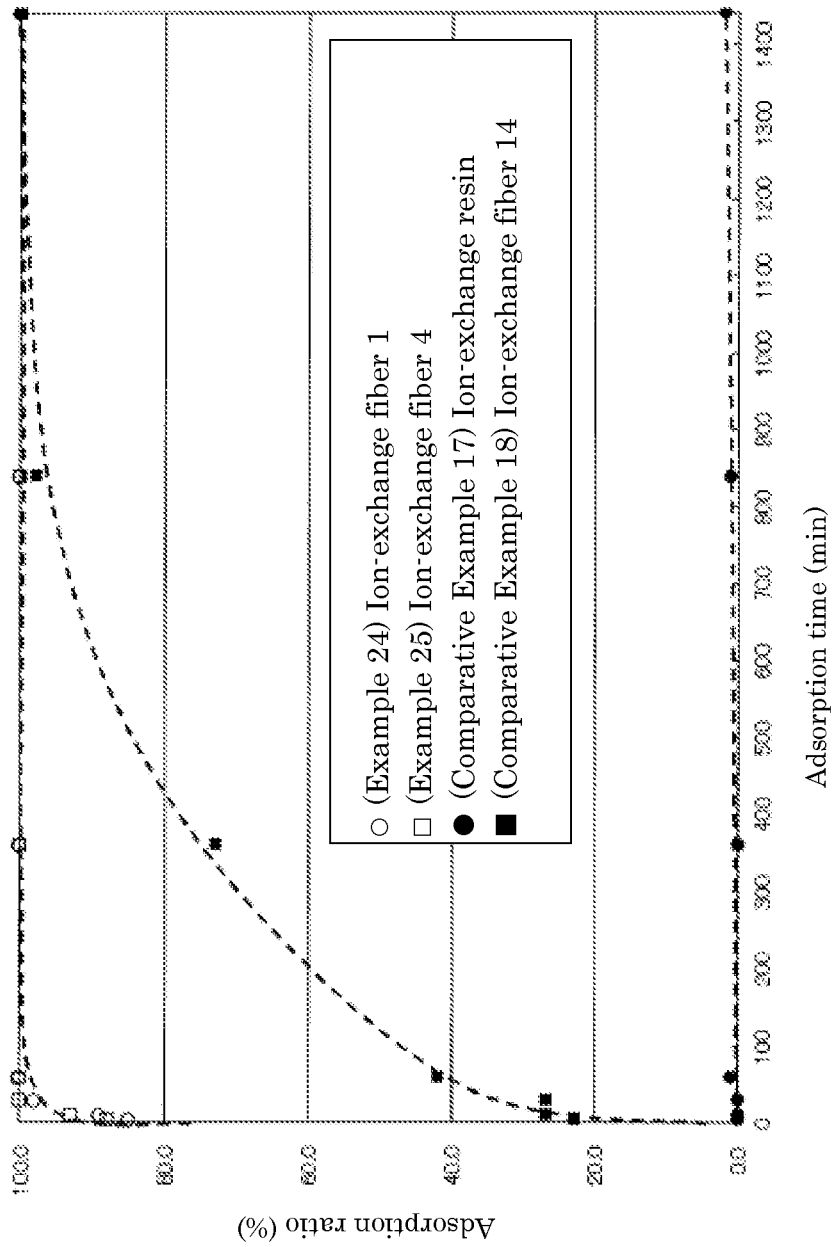
FIG. 3 is a graph showing results of Examples 24 and 25 and Comparative Examples 17 and 18.

First, 1,000 ppm lead(II) standard solution (manufactured by Wako Pure Chemical Industries, Ltd.) was diluted to prepare 10 ppm lead(II) standard solution. To 30 g of the standard solution, 0.15 g of the ion-exchange fiber 1 or 4 (Example 24 or 25) was added. As Comparative Examples, to 30 g of the standard solution, 0.15 g of any adsorbent of an ion-exchange resin (Comparative Example 17) and the ion-exchange fiber 14 (Comparative Example 18) produced in Production Example 20 was added. Each mixture was stirred at room temperature and was filtrated after 5 minutes, 10 minutes, 30 minutes, 60 minutes, 6 hours, 14 hours, and 24 hours to remove the adsorbent. The lead(II) ion concentration in the filtrate was quantitatively determined by ICP emission spectrometry at each time. From the lead(II) ion concentration in the filtrate at each time, the lead(II) ion adsorption ratio was calculated at each time. Table 6 shows the results. FIG. 3 is a graph of Table 6.

TABLE 6

| | | Lead(II) ion adsorption ratio (%) | | | | | | |
|---|---|---|---|---|---|---|---|---|
| | Adsorbent | After 5 minutes | After 10 minutes | After 30 minutes | After 60 minutes | After 6 hours | After 14 hours | After 24 hours |
| Example | 24 Ion-exchange fiber 1 | 85.0 | 89.0 | 98.0 | 100.0 | 100.0 | 100.0 | 100.0 |
| | 25 Ion-exchange fiber 4 | 88.0 | 93.0 | 100.0 | 100.0 | 100.0 | 100.0 | 100.0 |
| Comparative Example | 17 Ion-exchange resin | 23 | 27 | 27 | 42 | 73 | 98 | 100 |
| | 18 Ion-exchange fiber 14 | 0 | 0 | 0 | 1 | 0 | 1 | 2 |

As apparent from the results, the lead(II) ion adsorption by the method of the present invention achieved an adsorption ratio of 100% within 60 minutes. In contrast, the lead(II) ion adsorption by other embodiments than the method of the present invention required 6 hours or more to achieve an adsorption ratio of 100%. These results reveal that the method of the present invention can be used to achieve rapid and highly efficient removal and adsorption of iodide ions.

Examples 26 and 27 and Comparative Examples 19 and 20

Adsorption of Lead(II) Ion (2)

Figure 4:
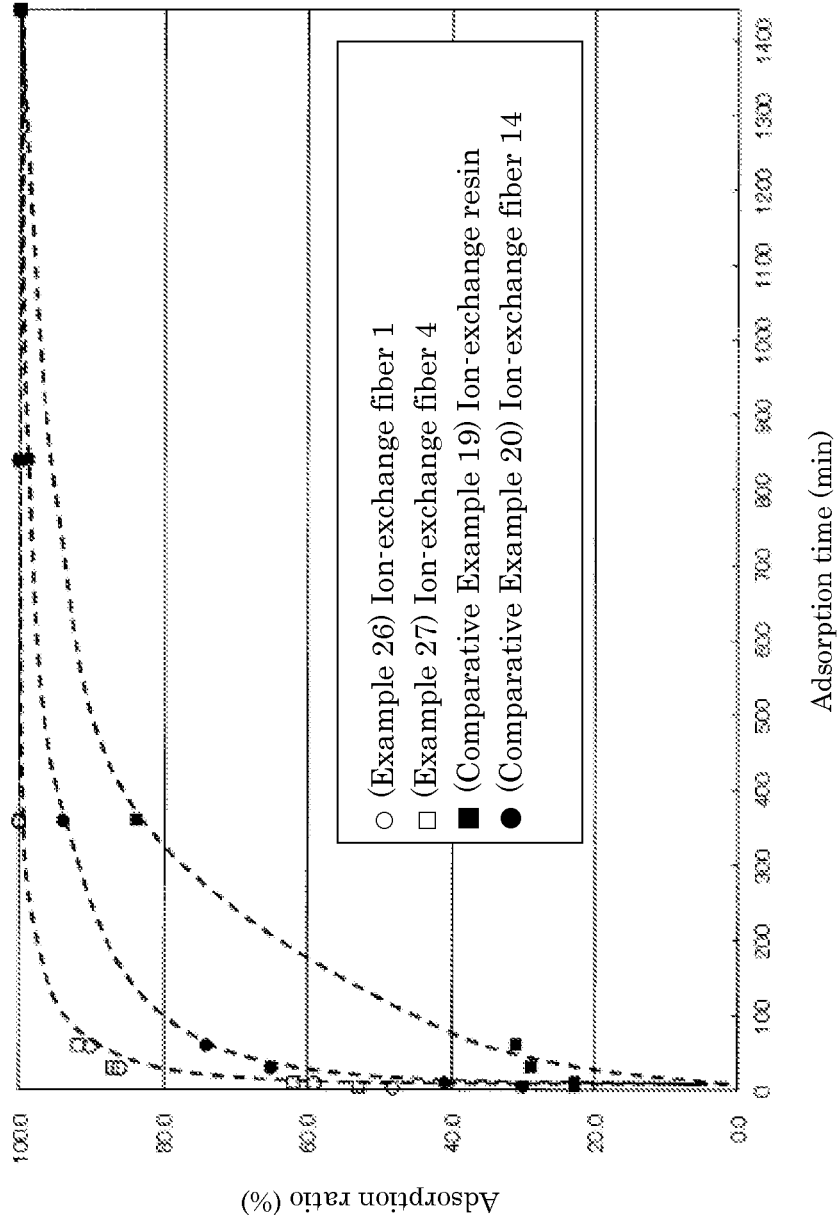
FIG. 4 is a graph showing results of Examples 26 and 27 and Comparative Examples 19 and 20.

Next, 1,000 ppm lead(II) standard solution (manufactured by Wako Pure Chemical Industries, Ltd.) was diluted to prepare 100 ppm lead(II) standard solution. The standard solution was used to determine the lead(II) ion concentration in the filtrate at each time in a similar manner to that in Examples 24 and 25 and Comparative Examples 17 and 18 and the lead(II) ion adsorption ratio was calculated at each time. Table 7 shows the results. FIG. 4 is a graph of Table 7.

Examples 28 and 29 and Comparative Examples 21 and 22

Adsorption of Borate Ion

Figure 5:
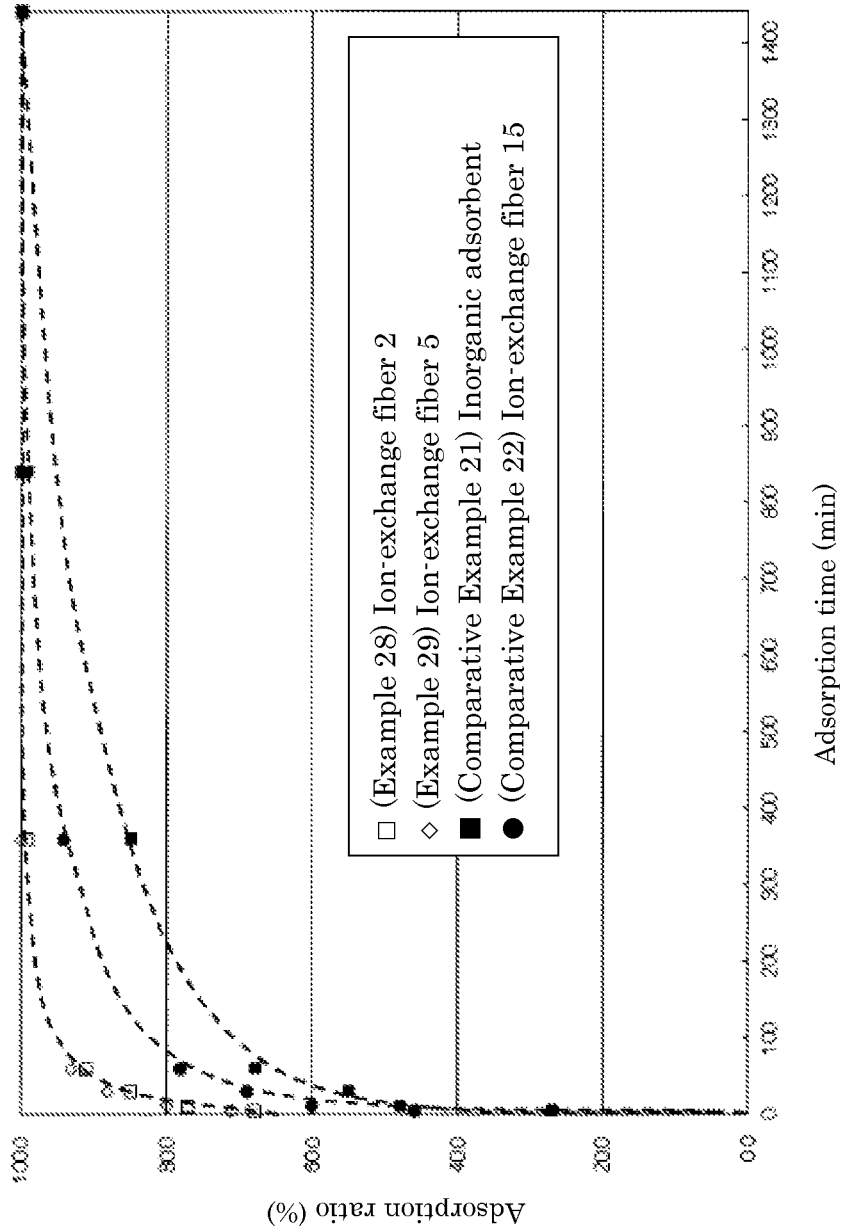
FIG. 5 is a graph showing results of Examples 28 and 29 and Comparative Examples 21 and 22.

First, 1,000 ppm boric acid standard solution (manufactured by Wako Pure Chemical Industries, Ltd.) was diluted to prepare 10 ppm boric acid standard solution. To 30 g of the standard solution, 0.15 g of ion-exchange fiber 2 (Example 28) or ion-exchange fiber 5 (Example 29) was added. Separately, as Comparative Examples, to 30 g of the standard solution, 0.15 g of any adsorbent of an inorganic adsorbent (Comparative Example 21) and an ion-exchange fiber 15 (Comparative Example 22) was added. Each mixture was stirred at room temperature and was filtrated after 5 minutes, 10 minutes, 30 minutes, 60 minutes, 6 hours, 14 hours, and 24 hours to remove the adsorbent. The borate ion concentration in the filtrate was quantitatively determined by ICP emission spectrometry at each time. From the borate ion concentration in the filtrate at each time, the borate ion adsorption ratio was calculated at each time. Table 8 shows the results. FIG. 5 is a graph of Table 8.

TABLE 7

| | | Adsorbent | Lead(II) ion adsorption ratio (%) | | | | | | |
| --- | --- | --- | --- | --- | --- | --- | --- | --- | --- |
| | | | After 5 minutes | After 10 minutes | After 30 minutes | After 60 minutes | After 6 hours | After 14 hours | After 24 hours |
| Example | 26 | Ion-exchange fiber 1 | 48.0 | 59.0 | 86.0 | 90.0 | 100.0 | 100.0 | 100.0 |
| | 27 | Ion-exchange fiber 4 | 53.0 | 62.0 | 87.0 | 92.0 | 100.0 | 100.0 | 100.0 |
| Comparative | 19 | Ion-exchange resin | 23 | 23 | 29 | 31 | 84 | 99 | 100 |
| Example | 20 | Ion-exchange fiber 14 | 30 | 41 | 65 | 74 | 94 | 100 | 100 |

In the test, the adsorption speed was slower than that at 10 ppm, but the lead(II) ion adsorption by the method of the present invention achieved an adsorption ratio of about 100% within 6 hours. In contrast, the lead(II) ion adsorption by other embodiments than the method of the present invention required 10 hours or more to achieve an adsorption ratio of 100%.

The results of Examples 24 to 27 and Comparative Examples 17 to 20 reveal that the method of the present invention can be used to achieve rapid and highly efficient removal of lead(II) ions and the effect is especially high at a low concentration.

TABLE 8

| | | Adsorbent | Borate ion adsorption ratio (%) | | | | | | |
| --- | --- | --- | --- | --- | --- | --- | --- | --- | --- |
| | | | After 5 minutes | After 10 minutes | After 30 minutes | After 60 minutes | After 6 hours | After 14 hours | After 24 hours |
| Example | 28 | Ion-exchange fiber 2 | 68.0 | 77.0 | 85.0 | 91.0 | 99.0 | 100.0 | 100.0 |
| | 29 | Ion-exchange fiber 5 | 71.0 | 80.0 | 88.0 | 93.0 | 100.0 | 100.0 | 100.0 |
| Comparative | 21 | Inorganic adsorbent | 27 | 48 | 55 | 68 | 85 | 99 | 100 |
| Example | 22 | Ion-exchange fiber 15 | 46 | 60 | 69 | 78 | 94 | 100 | 100 |

As apparent from the results, the borate ion adsorption by the method of the present invention achieved a borate ion adsorption ratio of 90% or more within 60 minutes. In contrast, the borate ion adsorption by other embodiments than the method of the present invention required 6 hours or more to achieve a total borate ion adsorption ratio of 90% or more. These results reveal that the method of the present invention can be used to achieve rapid and highly efficient removal and adsorption of borate ions.

The above results revealed that the method of the present invention can be used to achieve rapid and highly efficient removal and adsorption of various chemical substances in water. The results particularly revealed that a chemical substance at a low concentration can be rapidly adsorbed, and the method of the present invention can be used to achieve efficient removal and adsorption of chemical substances.

The invention claimed is:

1. An ion-exchange fiber comprising:
   a polymer A obtained by introducing an ion-exchangeable substituent to 100 parts by weight of an acrylic polymer, the acrylic polymer being obtained by polymerization of a monomer composition containing 30% by weight or more of acrylonitrile with respect to 100% by weight of the composition; and
   a polymer B obtained by introducing an ion-exchangeable substituent to 1 part by weight or more and 100 parts by weight or less of an epoxy group-containing polymer,
   each ion-exchangeable substituent being introduced by reaction with an amine compound and being an ion-exchangeable substituent derived from the amine compound.

2. The ion-exchange fiber according to claim 1, wherein the ion-exchange fiber has a fiber strength of 0.8 cN/dtex or more and an ion-exchange capacity of 0.8 mmol/g or more.

3. The ion-exchange fiber according to claim 1, wherein the amine compound is reacted to increase the nitrogen content by 1.0% by weight or more.

4. The ion-exchange fiber according to claim 1, wherein the acrylic polymer contains a halogen atom and is reacted with the amine compound to reduce the halogen content by 1.0% by weight or more.

5. The ion-exchange fiber according to claim 2, wherein the ion-exchange capacity is 1.0 mmol/g or more.

6. An ion-exchange fiber being a cross-linked acrylic fiber introduced with an ion-exchangeable substituent derived from an amine compound by reaction with the amine compound, the cross-linked acrylic fiber being cross-linked by the amine compound, the amine compound being reacted to increase the nitrogen content by 1.0% by weight or more, and the ion-exchange fiber having a fiber strength of 0.8 cN/dtex or more and an ion-exchange capacity of 0.8 mmol/g or more.

7. The ion-exchange fiber according to claim 6, wherein the cross-linked acrylic fiber is a cross-linked modacrylic fiber.

8. The ion-exchange fiber according to claim 6, wherein the cross-linked acrylic fiber contains a halogen atom and is reacted with the amine compound to reduce the halogen content by 1.0% by weight or more.

9. The ion-exchange fiber according to claim 6, wherein the ion-exchange capacity is 1.0 mmol/g or more.

10. A method for producing the ion-exchange fiber according to claim 1, the method comprising the steps of:
    (1) blending and spinning 100 parts by weight of an acrylic polymer obtained by polymerization of a monomer composition containing 30% by weight or more of acrylonitrile with respect to 100% by weight of the composition and 1 part by weight or more and 100 parts by weight or less of an epoxy group-containing polymer to yield a precursor fiber; and
    (2) reacting the precursor fiber with an amine compound at a temperature of higher than 100° C. to introduce an ion-exchangeable substituent derived from the amine compound to the acrylic polymer and the epoxy group-containing polymer included in the precursor fiber.

11. A method for removing and adsorbing a chemical substance in water, the method using an ion-exchange fiber, and the ion-exchange fiber being the ion-exchange fiber according to claim 1.

12. The method for removing and adsorbing a chemical substance in water according to claim 11, wherein the chemical substance is an ionic chemical substance.

13. The method for removing and adsorbing a chemical substance in water according to claim 12, wherein the ionic chemical substance is an ionic chemical substance containing at least one ion selected from the group consisting of anions selected from a halide ion, a polyhalide ion, and an oxoacid ion; and ions of the group III to XVI heavy metals, ions of heavy metallic elements selected from lanthanoids and actinoids, and complex ions of them.

14. The method for removing and adsorbing a chemical substance in water according to claim 13, wherein the ionic chemical substance is an ionic chemical substance containing a halide ion and the halide ion is an iodide ion.

15. A device for removing and adsorbing a chemical substance in water, the device comprising an adsorbent including at least one ion-exchange fiber selected from the ion-exchange fibers according to claim 1.

16. The ion-exchange fiber according to claim 1,
    wherein the acrylic polymer is a modacrylic polymer obtained by polymerization of a monomer composition containing 30% by weight or more and 70% by weight or less of acrylonitrile, 30% by weight or more and 70% by weight or less of a halogen-containing vinylidene monomer and/or a halogen-containing vinyl monomer, and 0% by weight or more and 10% by weight or less of a vinyl monomer copolymerizable with them, with respect to 100% by weight of the composition.

17. The ion-exchange fiber according to claim 1,
    wherein the amine compound incudes a compound having two or more amino groups in total per molecule.

18. The ion-exchange fiber according to claim 1,
    wherein the amine compound incudes a compound having an amino group in total per molecule.

19. The ion-exchange fiber according to claim 16,
    wherein the ion-exchange fiber includes the polymer A obtained by introducing the ion-exchangeable substituent to 100 parts by weight of the modacrylic polymer and the polymer B obtained by introducing the ion-exchangeable substituent to 1 part by weight or more and 70 parts by weight or less of the epoxy group-containing polymer.

20. The ion-exchange fiber according to claim 19,
    wherein the ion-exchange fiber includes the polymer A obtained by introducing the ion-exchangeable substituent to 100 parts by weight of the modacrylic polymer and the polymer B obtained by introducing the ion-exchangeable substituent to 1 part by weight or more and less than 50 parts by weight of the epoxy group-containing polymer.

21. The ion-exchange fiber according to claim 20,
    wherein the ion-exchange fiber includes the polymer A obtained by introducing the ion-exchangeable substituent to 100 parts by weight of the modacrylic polymer and the polymer B obtained by introducing the ion-exchangeable substituent to 1 part by weight or more and 30 parts by weight or less of the epoxy group-containing polymer.

22. The ion-exchange fiber according to claim 1,
    wherein the amine compound includes a compound having at least one primary amine as an amino group.

23. The ion-exchange fiber according to claim 1,
    wherein the amine compound includes a compound having at least one polar substituent in addition to an amino group.

* * * * *